(12) United States Patent
Dalbec et al.

(10) Patent No.: US 10,419,794 B2
(45) Date of Patent: Sep. 17, 2019

(54) SYSTEMS AND METHODS FOR SYNCHRONIZING MEDIA ASSET PLAYBACK FROM MULTIPLE SOURCES

(71) Applicant: Rovi Guides, Inc., San Carlos, CA (US)

(72) Inventors: Gabriel C. Dalbec, Morgan Hill, CA (US); Alexander W. Liston, Menlo Park, CA (US); Mathew C. Burns, Dublin, CA (US); Ajay Kumar Gupta, Andover, MA (US); William L. Thomas, Evergreen, CO (US); Margret B. Schmidt, Redwood City, CA (US); Jonathan A. Logan, Mountain View, CA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 15/462,206

(22) Filed: Mar. 17, 2017

(65) Prior Publication Data

US 2018/0270516 A1    Sep. 20, 2018

(51) Int. Cl.
| | |
|---|---|
| H04N 21/242 | (2011.01) |
| H04N 21/4402 | (2011.01) |
| H04N 21/234 | (2011.01) |
| H04N 21/433 | (2011.01) |
| H04N 21/472 | (2011.01) |
| H04N 21/462 | (2011.01) |

(52) U.S. Cl.
CPC ..... *H04N 21/242* (2013.01); *H04N 21/23418* (2013.01); *H04N 21/4333* (2013.01); *H04N 21/440245* (2013.01); *H04N 21/4622* (2013.01); *H04N 21/47217* (2013.01)

(58) Field of Classification Search
CPC .. G11B 27/10; G11B 27/11; H04N 21/23418; H04N 21/234345; H04N 21/242; H04N 21/440245; H04N 21/4333; H04N 21/4622; H04N 21/47217
See application file for complete search history.

(56) References Cited

U.S. PATENT DOCUMENTS

| | | | |
|---|---|---|---|
| 6,236,395 B1 * | 5/2001 | Sezan | G06F 17/30035 348/E5.105 |
| 8,233,530 B2 * | 7/2012 | Amsterdam | G11B 27/10 345/632 |

(Continued)

*Primary Examiner* — Hai V Tran
*Assistant Examiner* — Jen-Shi Huang
(74) *Attorney, Agent, or Firm* — Haley Guiliano LLP

(57) ABSTRACT

Systems and methods are described herein for synchronizing playback of media assets from multiple sources. For example, if a media asset is being delivered from two sources, a media guidance application may compare features in the media asset from the two sources and determine the amount of time that the two sources are out of synchronization. If the amount of time is greater than a threshold amount of time, the media guidance application may transmit supplemental content to a device receiving the media asset from the source that is ahead, such that the two sources are synchronized after the supplemental content is finished. If the amount of time is less than a threshold amount of time, the media guidance application may instruct the device receiving the media asset from the source that is ahead to pause the media asset until the two sources are synchronized.

20 Claims, 8 Drawing Sheets

(56) References Cited

U.S. PATENT DOCUMENTS

| | | | |
|---|---|---|---|
| 9,510,044 B1 * | 11/2016 | Pereira | H04N 21/44008 |
| 9,542,976 B2 * | 1/2017 | Sipe | G11B 27/11 |
| 2005/0193425 A1 * | 9/2005 | Sull | G06F 17/30817 |
| | | | 725/135 |
| 2013/0173742 A1 | 7/2013 | Thomas et al. | |
| 2014/0096169 A1 * | 4/2014 | Dodson | H04N 21/262 |
| | | | 725/97 |
| 2015/0078729 A1 | 3/2015 | Sipe et al. | |

\* cited by examiner

SYSTEMS AND METHODS FOR SYNCHRONIZING MEDIA ASSET PLAYBACK FROM MULTIPLE SOURCES

BACKGROUND

Modern consumers of media content have access to a plethora of media from a variety of sources. For example, the same movie or episode of a television show may be available from a television network through on-demand, live feeds, or recorded by a user using a digital video recorder (DVR). Furthermore, the same media content may be available from numerous third-party services. Each of these sources may insert commercials or other additional content at different times and for different durations. Thus, two users who are both at a playback point often minutes from when a media asset began from different sources may not be at the same point in the action in the media asset. To alleviate the problem where two sources were not synchronized at the same time point, some conventional systems attempted to align the action in the media assets based on closed caption text. However, not all media assets include closed caption text, and furthermore the closed caption text may be initially displayed by different sources at different times and for different durations, leading to less accurate synchronization of a media asset from two sources.

Additionally, when resynchronizing a media asset from two sources, some conventional systems would accelerate or decelerate playback from one source until the media asset was synchronized with another source. However, if the sources were out of synchronization by a large duration of time, some users may find this approach distracting.

SUMMARY

Accordingly, systems and methods are described herein for synchronizing playback of media assets from multiple sources. For example, if a media asset is being delivered from two sources, a media guidance application (e.g., executed by a synchronization server) may compare features in the media asset from the two sources and determine (e.g., based on when particular objects in the media asset appear) the amount of time that the two sources are out of synchronization. If the amount of time is greater than a threshold amount of time, the media guidance application may transmit supplemental content to a device receiving the media asset from the source that is ahead such that the two sources are synchronized after the supplemental content is finished. If the amount of time is less than a threshold amount of time, the media guidance application may instruct the device receiving the media asset from the source that is ahead to pause the media asset until the two sources are synchronized. In this way, the two sources are synchronized with minimal effect on the playback to the user.

In some aspects, the media guidance application may compare a first feature in a media asset transmitted from a first source with a second feature in the media asset transmitted from a second source. For example, the media guidance application may determine whether the media asset can be received from the first source and/or the second source (e.g., based on permissions). If the media guidance application can receive the media asset from a source, the media guidance application receives frames of the media asset. The media guidance application may analyze the audiovisual content of frames of the media asset received from the first and second sources. Specifically, the media guidance application may detect a particular feature, such as a character, a sound, a distinctive object such as a car, or any other audio or visual feature in the media asset. Based on detecting a particular feature in the media asset received from one of the sources, the media guidance application may search for that same feature in frames received from the other source. For example, the media guidance application may find a particular set of instructions for generating a face in pixel coordinates, or audio of particular frequencies and intensities in a data packet for the media asset from one source and may search for the same data in data packets received from the other source. Alternatively or additionally, the media guidance application may determine that while the two features are not identical they correspond (e.g., within a margin of error) or that the features, while different, indicate a particular difference in time that can be used to resynchronize the sources (e.g., the time remaining in a sporting event).

If the media guidance application cannot receive the media asset from one of the sources, the media guidance application may transmit an indication to a user device (e.g., a set-top box) that is receiving the media asset from a first source and has requested synchronization with another source. If the media guidance application cannot receive the media asset from the other source as well, the media guidance application may also transmit an indication to a user device that is receiving the media asset from the other source. Based on the receiving the indication, the user device may perform the analysis of frames being received and transmit identifying data (e.g., a fingerprint) and corresponding time code in the media asset to the media guidance application. For example, the user device may detect a character's face 12 minutes into the media asset in the same manner as the media guidance application detects features described above. The user device may transmit identifying data of the character's face (e.g., pixel coordinates) and the time stamp when it appeared to the media guidance application which can use the information to determine the period of time that the first source is out of synchronization with another source. In some embodiments, the user device does not process the media asset to determine a feature, but instead generates a reduced version of the media asset (e.g., fingerprints) which the media guidance application then analyzes (as described above).

In some embodiments, a media guidance application may simultaneously receive a first portion of a media asset from a first source and a second portion of the media asset from a second source. For example, upon receiving a request to synchronize two sources, the media guidance application may receive progress points of users viewing the two sources and receive frames, either directly from the source or from the user devices, starting at those progress points. For example, the media guidance application may receive data packets from a first source (e.g., a cable television channel) and a second source (e.g., an online streaming service). The media guidance application may receive the data packets in real-time and store a buffer of a fixed (e.g., 10 seconds) or variable duration (e.g., if two sources are substantially out of sync, the media guidance application may store audiovisual data from the other sources until a common feature is detected, as described further below). By buffering the audiovisual data from the first and second source, the media guidance application can analyze frames from the two sources and determine whether they are out of synchronization and take corrective action to synchronize the streams from the two sources.

The media guidance application may receive a first plurality of frames over a first time interval from the first source. For example, the media guidance application may receive, from a first source, data packets containing audiovisual information associated with the media asset at particular points in time (e.g., indexed by time codes). The media guidance application may receive a second plurality of frames over the first time interval from the second source. For example, the media guidance application may receive, from a second source, data packets containing audiovisual information associated with the media asset at particular points in time (e.g., indexed by time codes). The media guidance application may then store the first plurality of frames and the second plurality of frames. For example, the media guidance application may store the first plurality of frames in a first data structure and the second plurality of frames in a second data structure. Alternatively, the media guidance application may store frames received from both sources in the same data structure with an identifier for each frame. The data structure may be an array, list, circular buffer, or any other suitable data structure for storing audiovisual data of media assets.

The media guidance application may continuously receive frames from the first source and/or the second source which replace the oldest frames in a "first in, first out" data structure, such as a circular buffer. Alternatively or additionally, the media guidance application may receive frames from the two sources at predetermined intervals. For example, every five seconds, the media guidance application may receive the next five seconds of frames from both sources. Alternatively or additionally, the media guidance application may receive the entirety of the media asset from both sources at once. The media guidance application may implement a dynamic array or other variable size data structure to receive frames from either or both of the first and second sources. For example, if a feature detected in a frame of one source is not detected in any frames in the buffer of the second source, the media guidance application may determine that the sources are out of synchronization greater than the length of the buffer and may increase the buffer size.

In some embodiments, the media guidance application may receive a user selection from a first user to synchronize viewing of the media asset with a second user. For example, the media guidance application may generate for display a graphical user interface prior to or during display of the media asset. The graphical user interface may contain identifiers of users that the user associates with (e.g., friends, family etc.) based on social networking profiles of the user and/or manually entered by the user. The media guidance application may receive a user selection from the user to synchronize viewing of the media asset with another user (e.g., by the user selecting one of the users using a user input interface such as a remote control). The media guidance application may then determine that the first user is consuming the media asset from the first source and that the second user is consuming the media asset from the second source. For example the media guidance application may receive an indication of a source and a current playback point in the media asset from a user device of each user. For example, if the two users receive the media asset from the same source, the media guidance application may simply ensure that the time codes corresponding to playback points of the two users match. However, if the sources are different, than the media guidance application may need to synchronize the two sources. The media guidance application may transmit a request to a user device that the second user is using to consume the media asset to identify a source that the media asset is being received from. Alternatively or additionally, the media guidance application may access a data structure containing identifiers of user devices and status information for the user devices (e.g., what source each user device is currently receiving media from) and determine the source of the media asset for the first user and the second user.

The media guidance application may determine that the first source and the second source are different. For example, based on identifiers of the two sources being non-equivalent (e.g., "ABC" and "Netflix"), the media guidance application may determine that the media asset is being received from different sources by the users and may be out of synchronization. If the media asset is available to the media guidance application from both sources, the media guidance application, in response to determining that the first source and the second source are different, simultaneously receives the first portion of the media asset from the first source and the second portion of the media asset from the second source. For example, the media guidance application may receive portions of the media asset from the two sources to determine whether the two sources are synchronized or not, as described further below. If the media guidance application does not have access to the media asset from one or both sources, the media guidance application may instruct the user device to identify features in the media asset and transmit time stamps and indications of the features, and/or the media guidance application may instruct the user device to transmit fingerprints to the media guidance application which performs the analysis, as described above. In some embodiments, even if two users are viewing a media asset from the same source, due to latency the media asset may be out of synchronization for the two users. For example, the media guidance application may, in response to determining that the users are consuming the media asset from the same source, receive from respective user devices of the users an indication of a frame that was displayed by the user device at a specific time. If the frames are not the same, and/or are greater than a threshold difference, the media guidance application may determine that the media asset is out of synchronization and may perform the method described below to resynchronize the media asset.

In some embodiments, the media guidance application may determine whether a feature detected in the media asset from one source matches a feature detected in the media asset from another source. Specifically, the media guidance application may determine the first feature in a first frame of the first portion. For example, the media guidance application may determine that a particular set of instructions for generating pixels of a first frame correspond to instructions to generate a face of an actor for the first time in the media asset. The media guidance application may analyze the audiovisual properties of the first frame. For example, the media guidance application may determine the frequencies and amplitude of audio for a given frame, patterns of pixels that will be displayed for the frame, and other audiovisual information specific to the frame to determine if a feature is present in the frame. The media guidance application may determine an object in the first frame based on analyzing the audiovisual properties. For example, the media guidance application may determine that a particular set of instructions for generating pixels forms a pattern that is likely a face of a character. The media guidance application may then compare the object with a plurality of objects stored in a database for the media asset. For example, the media guidance application may access a database containing known objects for the media asset (e.g., stored locally in storage or remote at a server). The media guidance application may determine that the object matches a first object of the plurality of objects. For example, the media guidance application may compare the data corresponding to the object (e.g., pixel coordinates or audio information) with data stored in the database to determine whether the object matches a known object in the media asset. The media guidance application, in response to determining that the object matches the first object, determines that the object is the first feature. For example, once a match is determined, the media guidance application may determine that the object is a feature in the media asset and may search the frames from the other source to find the time code where the same feature appears to determine whether the media assets are synchronized.

The media guidance application may search frames of the second portion to determine a second frame containing the feature. For example, the media guidance application may iteratively search through frames of the media asset received from the second source for another feature. The media guidance application may search frames corresponding to time codes before and after the time code where the first feature was detected in the first portion (e.g., from the first source). As discussed above, the media guidance application is constrained in that in many implementations only a subset of the total media asset is stored in the buffer and able to be analyzed. However, the media guidance application may increase the size of the buffer to search for the feature over a wider range of playback times, also as discussed above. The media guidance application may determine a second feature in the second frame of the second portion. For example, the media guidance application may, similar to determining the first feature, determine that a particular set of instructions for generating pixels of a second frame correspond to instructions to generate a face of an actor for the first time in the media asset. The media guidance application may compare audiovisual properties of the first feature with the audiovisual properties of the second feature. For example, the media guidance application may compare pixel coordinates, audio information, or other audiovisual data defining the two features to determine whether the features are the same. The media guidance application may determine, based on comparing the audiovisual properties of the first feature with the audiovisual properties of the second feature, that the second feature corresponds to the first feature. For example, in response to determining that the audiovisual data defining the two features matches, the media guidance application may determine that the two features match and the offset in time between the two is the duration that the sources are out of synchronization.

The media guidance application may determine, based on the comparison, that a playback point of the media asset from the first source is further than a playback point of the media asset from the second source by a period of time. For example, the media guidance application may determine a frame index (e.g., a time code) for the frames where the first feature and the second feature appear. Based on the frame rate (e.g., 24 frames per second) or alternatively a time code (e.g., which indicates hours:minutes:seconds:frame) the media guidance application may determine whether the first feature appears before the second feature or vice versa. The media guidance application may then determine whether the first source or the second source is at a further playback point (e.g., in the media asset itself, irrespective of any content added in such as advertisements). Based on the difference between the time codes or frame indexes, the media guidance application may determine the period of time that the two sources are out of synchronization.

In some embodiments, the media guidance application may determine the period of time that the two sources are out of synchronization from time code signals associated with the media asset. Specifically, the media guidance application may retrieve, from a first time code signal associated with the media asset from the first source, a first time code corresponding to the playback point containing the first feature. For example, the media guidance application may determine that a particular signal or header in a data packet contains binary coded decimal values corresponding to time indices of frames and retrieve those values. The media guidance application converts each binary coded decimal value to a corresponding decimal value corresponding to the first time code. For example, the media guidance application may determine that four particular bits relating to one value in the time code are "1001" which may correspond to the value "9" in the time code. For example, the media guidance application may determine from a first time code that the current progress point in "Superman" is thirty minutes from the beginning of the movie. The time code may be a numerical representation of the number of frames of the movie presented at a particular point in time. In the example above, the media guidance application may retrieve the time code (00:30:00:00) corresponding to (hour:minute:second:frame). The media guidance application may retrieve, from a second time code signal associated with the media asset from the second source, a second time code corresponding to the playback point containing the second feature. For example, as described above, the media guidance application may retrieve a second time code corresponding to the playback point containing the second feature from the second source (e.g., a character's face at 30 minutes into a movie). The media guidance application may compute the period of time by subtracting the second time code from the first time code. For example, the media guidance application may subtract each respective value of the second time code from the first time code (e.g., the minutes from the second time code are subtracted from the minutes of the first time code) to compute a difference time code, which can then be converted into a single unit of time (e.g., seconds).

In some embodiments, the media guidance application may allow a user to seamlessly select the same scene or point in the action of a media asset from different sources. For example, a user may want to start a media asset from a particular point (e.g., when the "Red Wedding" scene begins in Game of Thrones), but the media guidance application may not have an indication where that particular point is located from different sources. Specifically, the media guidance application may retrieve (e.g., from local storage or from a remote server) a fingerprint of the scene (e.g., containing the first feature) that the media guidance application may use to determine the playback point (e.g., time code) in the media asset where the particular scene occurs, as described above. Alternatively or additionally, the media guidance application may access an index of particular scenes and important points in a media asset mapped to time codes of the media asset from a first source (e.g., a broadcast source) and may determine features present in frames of the media asset from the first source at those time codes. For example, the media guidance application may determine that a goblet on a table is a feature defining the beginning of the "Red Wedding" scene based on it being present at the time code indicating the beginning of the scene from the first source. The media guidance application may then search a second source (e.g., an over-the-top service) for that feature, as described above, in order to determine the time code from the second source where the scene begins and play the media asset from the particular scene from the second source.

The media guidance application may determine whether the period of time is greater than a threshold period of time. For example, the media guidance application may compare the difference in playback between the two sources of the media asset to a threshold (e.g., 2 seconds). The media guidance application may determine whether values for the threshold and the period of time are in the same units and convert the units appropriately. The threshold may be any unit of time and may be variable depending on different user's preferences, as described further below.

In some embodiments, the media guidance application may determine the threshold period of time based on user preferences stored in a user profile. Specifically, the media guidance application may retrieve a user profile for a user associated with the user device receiving the media asset from the first source. For example, the media guidance application may access the user profile either locally in storage or remotely at a server. The media guidance application may retrieve, from the user profile, a user preference. For example, the media guidance application may retrieve data from the user profile (e.g., by executing a database query language script such as SQL) corresponding to a user preference. For example the user preference may indicate attributes of a media asset (e.g., genres) where the user does not want to be resynchronized with another source. For example, a particular user may prefer a sports event be paused as opposed to supplemental content inserted, in which case the media guidance application may assign a large threshold period of time based on the user preference. The media guidance application may compare the user preference to a plurality of user preferences stored in a database, wherein each user preference of the plurality of user preferences corresponds to one of a plurality of threshold periods of time. For example, the media guidance application may query a database to determine whether a string of characters and/or other value matches the user preference. The media guidance application may determine that the user preference corresponds to a stored user preference in the database. For example, if the user preference for "sports" media content is a value of 10 out of 10 (10 being the highest) for preferring to pause, the media guidance application may determine an appropriate threshold value by matching the value to a value in the database. The media guidance application may then retrieve a first threshold period of time corresponding to the stored user preference as the threshold period of time. For example, the media guidance application may retrieve a threshold period of time (e.g., 10 seconds) associated with the user preference matched in the database.

The media guidance application, in response to determining that the period of time is greater than the threshold period of time, may transmit supplemental content to a user device receiving the media asset from the first source. Specifically, the media guidance application compares the period of time to a plurality of durations stored in a supplemental content database, wherein each of a plurality of supplemental content stored in the supplemental content database is associated with a field containing one of the plurality of durations. For example the media guidance application may access a database containing a plurality of supplemental content either local in storage or remotely at a server. For example, the database may be structured as a table where each row contains information about a particular supplemental content, such as a type, a duration, and/or a pointer to a location in memory containing the supplemental content. In some embodiments the supplemental content may be stored in a different location than the database. The media guidance application may compare the value for the period of time (e.g., the offset between the two sources) with durations of supplemental content stored in the database.

The media guidance application may determine that the period of time corresponds to a duration of the plurality of durations. For example, the media guidance application may determine, based on comparing the period of time (e.g., 20 seconds) with durations associated with supplemental content in the database that a particular supplemental content has a matching duration (e.g., 20 seconds). Thus, by transmitting the particular supplemental content the media guidance application may resynchronize the media asset from the two sources.

The media guidance application may retrieve a first supplemental content associated with the duration. For example, the media guidance application may determine that a field associated with the first supplemental content contains a pointer to a location in storage where the supplemental content is stored. The media guidance application may then retrieve the supplemental content from the location in storage. Alternatively, the media guidance application may determine that a field associated with the first supplemental content contains an identifier of a location remote from the database (e.g., a URL) and may retrieve the supplemental content based on the identifier.

In some embodiments, the media guidance application may determine that the period of time does not correspond to any duration of the plurality of durations. For example, the media guidance application may determine, based on comparing the period of time (e.g., 20 seconds) with durations associated with supplemental content in the database that no supplemental content has a matching duration (e.g., 20 seconds). The media guidance application may then determine that the period of time is within a threshold duration of a first duration of the plurality of durations. For example, while the media guidance application may not find an exact match between the period of time and a duration of a supplemental content, a duration of a supplemental content may be within a threshold amount of time (e.g., +/−1 second) of the period of time that the sources are out of synchronization. Specifically, if the period of time is 20 seconds and the threshold is 2 seconds, then the media guidance application may determine that a supplemental content with a duration of 21 seconds matches the period of time when accounting for the threshold. The media guidance application, in response to determining that the period of time is within the threshold duration of the first duration, determines whether the first duration is greater than the period of time. For example, the media guidance application may compare the duration with the period of time (e.g., 20 seconds) to determine whether it is greater (e.g., 21 seconds) or less (e.g., 19 seconds) than the period of time.

The media guidance application, in response to determining that the first duration is greater than the period of time, may remove a first frame of a second supplemental content associated with the first duration. For example, the media guidance application may remove a frame or multiple frames of the supplemental content such that the duration of the supplemental content matches the period of time (e.g., that the sources are out of synchronization). The media guidance application may analyze the audiovisual properties of frames of the supplemental content to determine appropriate frame(s) to remove (e.g., based on the frames not containing human speech or being entirely one color signifying a cut or scene change). The media guidance application, in response to determining that the first duration is not greater than the period of time, may insert a second frame into the second supplemental content associated with the first duration. For example, the media guidance application may insert a frame or multiple frames of the supplemental content such that the duration of the supplemental content matches the period of time (e.g., that the sources are out of synchronization). The media guidance application may analyze the audiovisual properties of frames of the supplemental content to determine appropriate places to duplicate and/or insert frame(s) (e.g., based on the frames not containing human speech or being entirely one color signifying a cut or scene change).

In some embodiments, the media guidance application may determine that the period of time does not correspond to any duration of the plurality of durations. For example, the media guidance application may determine, based on comparing the period of time (e.g., 20 seconds) with durations associated with supplemental content in the database that no supplemental content has a matching duration (e.g., 20 seconds). The media guidance application may then determine that the period of time is greater than a threshold duration of each of the plurality of durations. For example, the media guidance application may determine that each supplemental content has a duration shorter than the period of time by a threshold amount. Specifically, if the period of time is 20 minutes and each supplemental content has a duration of roughly 30 seconds, the media guidance application may determine that the supplemental content are all greater than a threshold duration shorter than the period of time (e.g., if the threshold is 1 minute).

The media guidance application, in response to determining that the period of time is greater than the threshold duration of each of the plurality of durations, may determine a subset of the plurality of durations, wherein a total duration of the subset corresponds to the period of time. For example, the media guidance application may retrieve a first supplemental content of a plurality of supplemental content in the database. The media guidance application may initialize and store a variable for the total duration of retrieved supplemental content. For example, the first supplemental content retrieved from the database may have a duration of 30 seconds. The media guidance application may update the variable by adding 30 seconds to the existing value. The media guidance application may then iteratively (e.g., via a for-loop) retrieve supplemental content until the variable for the total duration of retrieved supplemental content is within a threshold amount (e.g., corresponds) to the period of time that the two sources are out of synchronization. For example, the media guidance application may retrieve five 30-second long supplemental content clips if the period of time that the two sources are out of synchronization is two and a half minutes. In some embodiments, the media guidance application may retrieve particular supplemental content first. For example, the media guidance application may retrieve supplemental content indicated as high priority, or ranked, in the database before supplemental content indicated as low priority or ranked lower. Alternatively or additionally, the media guidance application may retrieve particular supplemental content based on user preferences stored in a user profile.

The media guidance application may then generate a custom supplemental content by combining each supplemental content associated with the subset of the plurality of durations. For example, the media guidance application may combine a plurality of supplemental content into a single custom supplemental content which has a duration corresponding to the period of time that the two sources are out of synchronization. For example, the media guidance application may retrieve five supplemental content clips from the database and arrange them one after the other to form a longer cohesive supplemental content. In some embodiments, the media guidance application may arrange which supplemental content is transmitted to user equipment first based on the length of the supplemental content. For example, the media guidance application may transmit the longest supplemental content first. In some embodiments, the media guidance application may analyze the audiovisual content of frames at the beginning and end of each supplemental content to determine the order to transmit the plurality of supplemental content. For example, one supplemental content may end with 2 seconds of a single color (e.g., black) and a second supplemental content may start with 1 second of the same single color. Accordingly, the media guidance application may transmit the two supplemental contents one after the other such that the two different supplemental content clips appear as a single supplemental content (e.g., they seamlessly connect).

The media guidance application may store the media asset received from the first source in a buffer. For example, the media guidance application may store the portion of the media asset received while the supplemental content is being transmitted. The media guidance application may increase the size of a buffer that is already being used for the analysis of frames from the first source (as described above) if the buffer is dynamically allocated. If not, the media guidance application may create a new buffer for the media asset received while the supplemental content is being transmitted. In this way, the media guidance application ensures that none of the media asset is missed and that after the supplemental content is over, the media asset is resumed and synchronized with the other source that was at an earlier playback point.

The media guidance application may transmit the first supplemental content to a user device receiving the media asset from the first source instead of the media asset. For example, the media guidance application may transmit frames of the supplemental content to the user device receiving the media asset from the first source (e.g., which is ahead of the action of the media asset from the second source) in order to resynchronize the media asset from both sources. As described above, by transmitting the supplemental content when two sources are greater than a threshold period of time out of synchronization, the media guidance application may allow the two sources to be resynchronized without obscuring the media asset (e.g., by accelerating or decelerating playback). In some embodiments, the media guidance application may transmit an instruction to the user device to generate for display a notification informing the user that they are receiving supplemental content while another user catches up to their playback position.

The media guidance application may, upon completion of transmission of the first supplemental content, transmit the media asset from the buffer to the user device. For example, the media guidance application may determine that the entirety of the supplemental content has been transmitted and generated for display by a user device receiving the media asset from the first source. In order to minimize interruption to the user, the media guidance application may immediately transmit the media asset that was stored in the buffer to the user device. Alternatively or additionally, if the media guidance application determines that the media asset from the second source is still not resynchronized with the media asset from the first source, the media guidance application may delay transmission of the media asset for an additional period of time. For example, the media guidance application may determine that the difference between the two sources was 20 seconds prior to display of supplemental content and is now 0.5 seconds (e.g., due to additional delay from the second source or latency mismatches between sources). In response, the media guidance application may delay transmission of the media asset from the buffer to the user device receiving the media asset from the first source for the additional period of time (e.g., 0.5 seconds).

The media guidance application, in response to determining that the period of time is not greater than the threshold period of time, may pause, for the period of time, the media asset from the first source. For example, the media guidance application may determine that since the media asset is out of synchronization between the two sources by less than the threshold period of time, supplemental content need not be displayed and the media asset can be paused from the source that is further ahead. Specifically, the media guidance application may transmit an instruction to a user device to pause the media asset (e.g., if the user device has recording capabilities), or the media guidance application may store a buffer in the same manner as described above with respect to when supplemental content is transmitted. The media guidance application may transmit the same frame to the user device to simulate the user device pausing the media asset. In some embodiments, the media guidance application may transmit an instruction to the user device to generate for display a notification informing the user that the media asset is paused while another user catches up to their playback position.

In some embodiments, the media guidance application may determine whether the user device receiving the media asset from the first source has buffering capabilities. For example, the media guidance application may transmit a query to the user device for whether the user device contains storage for storing media assets. Alternatively or additionally, the media guidance application may transmit a query to the user device to identify an amount of storage available, if any. In this way, the media guidance application may determine whether the user device (a) has buffering capabilities and (b) has enough storage available to buffer the media asset for the period of time. The media guidance application may, in response to determining that the user device receiving the media asset from the first source does not have buffering capabilities, store the media asset received from the first source in the buffer. For example, as described above with respect to when supplemental content is transmitted to the user device, the media guidance application may store the portion of the media asset received from the first source while the media asset is being paused to allow the second source to reach the same point in the action (e.g., resynchronize, as described above). The media guidance application may transmit an identical frame from the media asset to the user device during the period of time. For example, the media guidance application may transmit a single frame to the user for the period of time to simulate the media asset being paused. In some embodiments, the single frame may not be a part of the media asset. For example, if two sources are out of synchronization in a sports event, the media guidance application may transmit a logo of a team playing, and/or scores related to the event (e.g., if the event is a football game, football scores from other games may be transmitted in the single frame).

The media guidance application, in response to determining that the user device receiving the media asset from the first source does have buffering capabilities, may transmit an instruction to the user device to pause the media asset for the period of time. For example, the media guidance application may transmit a data packet containing the instruction to the user device. The user device may receive the data packet and execute the instruction (e.g., to pause the media asset). The user device also may allocate storage to buffer the media asset received while the media asset is paused, such that when the period of time is over and the first and second sources are synchronized, playback can begin from the same point in the action.

The described systems and methods can resynchronize the same media asset received from two different sources based on how out of synchronization the media asset received from the two sources is. Conventional systems may resynchronize sources based on accelerating or decelerating playback. However, this process may obscure the media asset (e.g., by making an action sequence such as a car chase abnormally fast or slow). Particularly, conventional systems do not factor into the resynchronization process how out of synchronization the two sources are and perform an appropriate action. The described systems and methods, by accounting for the period of time that two sources of the same media asset are out of synchronization, maximize a user's enjoyment of media assets by performing an appropriate action to resynchronize a media asset from two sources. Specifically, the described systems and methods may pause a media asset if two sources are close to being synchronized, but may transmit supplemental content if the two sources are not close to being synchronized. In this way, the described systems and methods may minimize obstructions to the media asset (e.g., by not accelerating playback and only pausing for the media asset for a short period of time).

It should be noted the systems and/or methods described above may be applied to, or used in accordance with, other systems, methods and/or apparatuses described in this disclosure.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Systems and methods described for synchronizing playback of media assets from multiple sources. For example, if a media asset is being delivered from two sources, a media guidance application (e.g., executed by a synchronization server) may receive the media asset from the two sources and determine (e.g., based on when particular objects in the media asset appear) the amount of time that the two sources are out of synchronization. If the amount of time is greater than a threshold amount of time, the media guidance application may transmit supplemental content to a device receiving the media asset from the source that is ahead such that the two sources are synchronized after the supplemental content is finished. If the amount of time is less than a threshold amount of time, the media guidance application may instruct the device receiving the media asset from the source that is ahead (e.g., based on the difference in time between when the same feature was displayed by two sources) to pause the media asset until the two sources are synchronized. In this way, the two sources are synchronized with minimal effect on the playback to the user.

Figure 1:
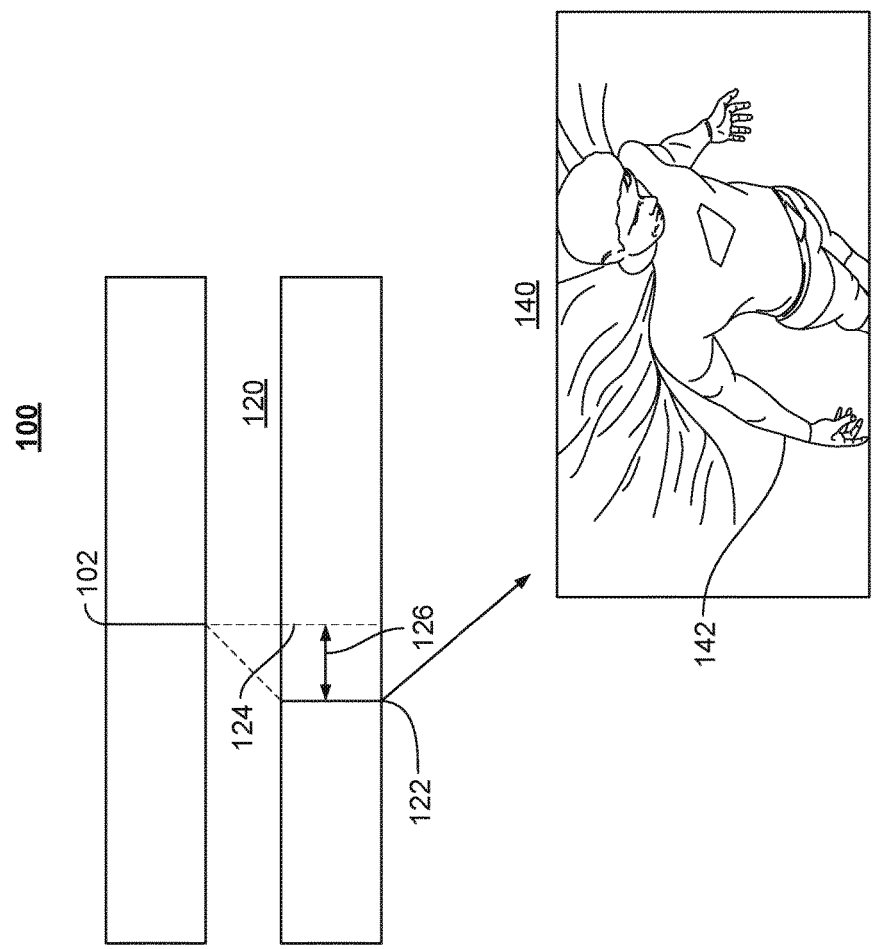
FIG. 1 shows an illustrative example of synchronizing playback of media assets from multiple sources, in accordance with some embodiments of the disclosure.

FIG. 1 shows an illustrative example of synchronizing playback of media assets from multiple sources, in accordance with some embodiments of the disclosure. For example, the media guidance application may receive portion 100 and portion 120 from different sources for the same media asset and may detect frame 140 containing feature 142 at different playback points in portions 100 and 120 indicating that the sources are not synchronized. Alternatively or additionally, portion 100 and/or 120 may be received by user equipment (e.g., as described below with respect to FIGS. 5-6) which may detect feature 142 and transmit an indication of time 102 and time 122 when feature 142 was detected to the media guidance application. Portion 100 may include frame 140 with feature 142 at time 102, while portion 120 may include frame 140 with feature 142 at time 122. Because of additional content added to the media asset from the source of portion 100, or content removed from the media asset from the source of portion 120, time 122 does not match time 102. Specifically, a user receiving the media asset from the source of portion 100 may receive frame 140 before a user receiving the media asset from the source of portion 120. Thus, at time 102, the corresponding time 124 of portion 120 is for a different frame and the two sources are out of synchronization by period of time 126. The media guidance application may use one or more of the processes described in FIGS. 7-10 to resynchronize a media asset from two or more sources or any of the features described therein.

In some aspects, the media guidance application may compare a first feature in a media asset transmitted from a first source with a second feature in the media asset transmitted from a second source. For example, the media guidance application may determine whether the media asset can be received from the first source (e.g., of portion 100) and/or the second source (e.g., of portion 120) based on permissions associated with the media guidance application. If the media guidance application can receive the media asset from a source, the media guidance application receives frames (e.g., frame 140) of the media asset. The media guidance application may analyze the audiovisual content of frames in the portions of the media asset received from the first and second sources. Specifically, the media guidance application may detect a particular feature (e.g., feature 142), such as a character, a sound, a distinctive object such as a car, or any other audio or visual feature in the media asset. Based on detecting a particular feature in the media asset received from one of the sources, the media guidance application may search for that same feature in frames received from the other source. For example, the media guidance application may find a particular set of instructions for generating a face in pixel coordinates, or audio of particular frequencies and intensities in a data packet for the media asset from one source and may search for the same data in data packets received from the other source. Alternatively or additionally, the media guidance application may determine that while the two features are not identical they correspond (e.g., within a margin of error) or that the features, while different, indicate a particular difference in time (e.g., period of time 126) that can be used to resynchronize the sources (e.g., the time remaining in a sporting event).

If the media guidance application cannot receive the media asset from one of the sources, the media guidance application may transmit an indication to a user device (e.g., a set-top box) that is receiving the media asset from a first source (e.g., of portion 100) and has requested synchronization with another source (e.g., of portion 120). If the media guidance application cannot receive the media asset from the other source as well, the media guidance application may also transmit an indication to a user device that is receiving the media asset from the other source. Based on the receiving the indication, the user device may perform the analysis of frames (e.g., frame 140) being received and transmit identifying data (e.g., a fingerprint) and corresponding time code in the media asset to the media guidance application. For example, the user device may detect a character's face 12 minutes into the media asset in the same manner as the media guidance application detects features described above. The user device may transmit identifying data of the character's face (e.g., pixel coordinates) and the time stamp when it appeared to the media guidance application which can use the information to determine the period of time (e.g., period of time 126) that the first source is out of synchronization with another source. In some embodiments, the user device does not process the media asset to determine a feature (e.g., feature 142), but instead generates a reduced version of the media asset (e.g., fingerprints) which the media guidance application then analyzes (as described above). In other embodiments, the user device transmits identifying data of the feature directly to the other user device (e.g., receiving the media asset from the second source), which allows the two user devices to determine the period of time and resynchronize the two sources without a middleman synchronization server. For example, the media guidance application may be implemented on one or both user devices to facilitate the resynchronization of the media asset from the two sources.

As referred to herein, a feature should be understood as any audiovisual data relating to a media asset that is distinguishable at a given playback point in the media asset. In some embodiments, the feature may be a face of a character, object, text, scene change, or other visual content. For example, the feature may be a change in brightness (e.g., lighting levels) indicating a scene change, a change in color balance, and/or a scene transition element such as a wipe or fade. In other embodiments, the feature may be a voice from a character, a particular sound affect, music, or other audio content. For example, the media guidance application may detect patterns (e.g., based on properties of the audio, such as frequencies and amplitude) in the audio and/or sound levels (e.g., volume at given playback points) to determine whether an audio feature is present in the media asset. In some embodiments, the feature may be a combination of audio and visual information. For example, the feature may be a frame where a face of a character is present and the character speaks. In some embodiments, the given playback point may be a particular frame with an associated time code. In other embodiments, the given playback point may be based on an index of the frame. For example, the media guidance application may determine that a frame where a feature appears is number 1000. Based on the frame rate, the media guidance application may determine a playback point associated with the frame index where a feature appears.

In some embodiments, a media guidance application may simultaneously receive a first portion of a media asset from a first source and a second portion of the media asset from a second source. For example, upon receiving a request to synchronize two sources, the media guidance application may receive progress points of users viewing the two sources and receive frames (e.g., portions 100 and 120) starting at those progress points. For example, the media guidance application may receive data packets from a first source (e.g., a cable television channel) and a second source (e.g., an online streaming service). The media guidance application may receive the data packets in real-time and store a buffer of a fixed (e.g., 10 seconds) or variable duration (e.g., if two sources are substantially out of sync, the media guidance application may store audiovisual data from the other sources until a common feature is detected, as described further below). By buffering the audiovisual data from the first and second source, the media guidance application can analyze frames from the two sources and determine whether they are out of synchronization and take corrective action to synchronize the streams from the two sources.

The media guidance application may receive a first plurality of frames over a first time interval from the first source. For example, the media guidance application may receive, from a first source, data packets containing audiovisual information (e.g., portion 100) associated with the media asset at particular points in time (e.g., indexed by time codes). The media guidance application may receive a second plurality of frames over the first time interval from the second source. For example, the media guidance application may receive, from a second source, data packets containing audiovisual information (e.g., portion 120) associated with the media asset at particular points in time (e.g., indexed by time codes). The media guidance application may then store the first plurality of frames and the second plurality of frames. For example, the media guidance application may store the first plurality of frames in a first data structure and the second plurality of frames in a second data structure. Alternatively, the media guidance application may store frames received from both sources in the same data structure with an identifier for each frame. The data structure may be an array, list, circular buffer, or any other suitable data structure for storing audiovisual data of media assets.

The media guidance application may continuously receive frames from the first source and/or the second source which replace the oldest frames in a "first in, first out" data structure, such as a circular buffer. Alternatively or additionally, the media guidance application may receive frames (e.g., portions 100 and 120) from the two sources at predetermined intervals. For example, every five seconds, the media guidance application may receive the next five seconds of frames from both sources. Alternatively or additionally, the media guidance application may receive the entirety of the media asset from both sources at once. The media guidance application may implement, upon receiving a request to synchronize two sources, a dynamic array or other variable size data structure to receive frames from either or both of the first and second sources. For example, if a feature (e.g., feature 142) detected in a frame of one source is not detected in any frames in the buffer of the second source, the media guidance application may determine that the sources are out of synchronization greater than the length of the buffer and may increase the buffer size.

In some embodiments, the media guidance application may determine whether a feature detected in the media asset from one source matches a feature detected in the media asset from another source. Specifically, the media guidance application may determine the first feature (e.g., feature 142) in a first frame (e.g., frame 140) of the first portion (e.g., portion 100). For example, the media guidance application may determine that a particular set of instructions for generating pixels of a first frame correspond to instructions to generate a face of an actor for the first time in the media asset. The media guidance application may analyze the audiovisual properties of the first frame. For example, the media guidance application may determine the frequencies and amplitude of audio for a given frame, patterns of pixels that will be displayed for the frame, and other audiovisual information specific to the frame to determine if a feature is present in the frame. The media guidance application may determine an object in the first frame based on analyzing the audiovisual properties. For example, the media guidance application may determine that a particular set of instructions for generating pixels forms a pattern that is likely a face of a character. The media guidance application may then compare the object with a plurality of objects stored in a database for the media asset. For example, the media guidance application may access a database containing known objects for the media asset (e.g., stored locally in storage or remote at a server). The media guidance application may determine that the object matches a first object of the plurality of objects. For example, the media guidance application may compare the data corresponding to the object (e.g., pixel coordinates or audio information) with data stored in the database to determine whether the object matches a known object in the media asset. The media guidance application, in response to determining that the object matches the first object, determines that the object is the first feature. For example, once a match is determined (e.g., that the object is feature 142), the media guidance application may determine that the object is a feature in the media asset and may search the frames from the other source (e.g., portion 120) to find the time code where the same feature appears to determine whether the media assets are synchronized.

The media guidance application may search frames of the second portion to determine a second frame containing the feature. For example, the media guidance application may iteratively search through frames of the media asset (e.g., portion 120) received from the second source for another feature. The media guidance application may search frames corresponding to time codes before and after the time code where the first feature was detected in the first portion (e.g., from the first source). As discussed above, the media guidance application may be constrained in that in many implementations only a subset of the total media asset is stored in the buffer and able to be analyzed. However, the media guidance application may increase the size of the buffer to search for the feature over a wider range of playback times, also as discussed above. The media guidance application may determine a second feature in the second frame of the second portion. For example, the media guidance application may, similar to determining the first feature, determine that a particular set of instructions for generating pixels of a second frame correspond to instructions to generate a face of an actor for the first time in the media asset. The media guidance application may compare audiovisual properties of the first feature (e.g., feature 142) with the audiovisual properties of the second feature. For example, the media guidance application may compare pixel coordinates, audio information, or other audiovisual data defining the two features to determine whether the features are the same. The media guidance application may determine, based on comparing the audiovisual properties of the first feature with the audiovisual properties of the second feature, that the second feature corresponds to the first feature. For example, in response to determining that the audiovisual data defining the two features matches, the media guidance application may determine that the two features match (e.g., both are feature 142) and the offset in time between the two (e.g., period of time 126) is the duration that the sources are out of synchronization.

The media guidance application may determine, based on the comparison, that a playback point of the media asset from the first source is further than a playback point of the media asset from the second source by a period of time. For example, the media guidance application may determine a frame index (e.g., a time code) for the frames where the first feature (e.g., time 102) and the second feature (e.g., time 122) appear. Based on the frame rate (e.g., 24 frames per second) or alternatively a time code (e.g., which indicates hours:minutes:seconds:frame) the media guidance application may determine whether the first feature appears before the second feature or vice versa. The media guidance application may then determine whether the first source or the second source is at a further playback point (e.g., in the media asset itself, irrespective of any content added in such as advertisements). Based on the difference between the time codes or frame indexes, the media guidance application may determine the period of time (e.g., period of time 126) that the two sources are out of synchronization.

In some embodiments, the media guidance application may determine the period of time that the two sources are out of synchronization from time code signals associated with the media asset. Specifically, the media guidance application may retrieve, from a first time code signal associated with the media asset from the first source, a first time code corresponding to the playback point (e.g., time 102) containing the first feature (e.g., feature 142). For example, the media guidance application may determine that a particular signal or header in a data packet contains binary coded decimal values corresponding to time indices of frames and retrieve those values. The media guidance application converts each binary coded decimal value to a corresponding decimal value corresponding to the first time code. For example, the media guidance application may determine that four particular bits relating to one value in the time code are "1001" which may correspond to the value "9" in the time code. For example, the media guidance application may determine from a first time code that the progress point where a feature appears in "Superman" from one source is thirty minutes from the beginning of transmission of the movie from the first source. The time code may be a numerical representation of the number of frames of the movie presented at a particular point in time. In the example above, the media guidance application may retrieve the time code (00:30:00:00) corresponding to (hour:minute:second:frame). The media guidance application may retrieve, from a second time code signal associated with the media asset from the second source, a second time code corresponding to the playback point containing the second feature. For example, as described above, the media guidance application may retrieve a second time code corresponding to the playback point (e.g., time 122) containing the second feature from the second source (e.g., feature 142). The media guidance application may compute the period of time by subtracting the second time code from the first time code. For example, the media guidance application may subtract each respective value of the second time code from the first time code (e.g., the minutes from the second time code are subtracted from the minutes of the first time code) to compute a difference time code, which can then be converted into a single unit of time (e.g., seconds) that represents the period of time the sources are out of synchronization (e.g., period of time 126).

In some embodiments, the media guidance application may allow a user to seamlessly select the same scene or point in the action of a media asset from different sources. For example, a user may want to start a media asset from a particular point (e.g., where Superman flies), but the media guidance application may not have an indication where that particular point (e.g., times 102 and 122) is located from different sources. Specifically, the media guidance application may retrieve (e.g., from local storage or from a remote server) a fingerprint of the scene (e.g., containing feature 142) that the media guidance application may use to determine the playback point (e.g., times 102 and 122) in the media asset where the particular scene occurs from different sources, as described above. Alternatively or additionally, the media guidance application may access an index (e.g., a table) of particular scenes and important points in a media asset mapped to time codes of the media asset from a first source (e.g., a broadcast source) and may determine features present in frames of the media asset from the first source at those time codes (e.g., time 102 is where feature 142 in frame 140 is present from a first source). For example, the media guidance application may determine that Superman flying for the first time is a feature defining the beginning of a particular scene in a media asset based on the feature (e.g., feature 142) being present at the time code indicating the beginning of the scene from the first source. The media guidance application may then search a second source (e.g., an over-the-top service) for that feature, as described above, in order to determine the time code from the second source where the scene begins and play the media asset from the particular scene from the second source.

In some embodiments, the media guidance application may access a database containing pairs of sources and typical periods of time that the sources are out of synchronization. For example, the database may be structured as a table, where each row contains indicators for two sources and an associated offset for a given time period (e.g., source A is behind source B by 10 seconds on average for every 1 minute of playback). The database may be stored locally in storage or remote at a server accessible via a communications network. For example, the media guidance application may determine from the database that broadcast source "ABC" and streaming service, "HULU" are out of synchronization by 100 seconds on average every 5 minutes, with ABC being behind HULU by that amount of time. The media guidance application may access the database before or after making the determination of the period of time (e.g., period of time 126) the two sources are out of synchronization. For example, the media guidance application may access the database and retrieve a value for the typical period of time two sources are out of synchronization from a field in the database after determining that a feature (e.g., feature 142) is present in a frame (e.g., at time 102) from the first source. The media guidance application may use the value to determine roughly what frame(s) to search in the second source to find the same feature, potentially saving time and computational resources (e.g., frame 140 from the second source appearing at time 122 may be more quickly determined). Alternatively or additionally, the media guidance application may access the database after detecting the second feature from the second source and determining the period of time that the two sources are out of synchronization and compare the period of time to the typical period of time stored in the database. The media guidance application may then update the typical period of time stored in the database for the two sources. For example, the media guidance application may adjust the typical period of time by an amount to better reflect the current synchronization offsets between two sources. For example, ABC may be showing more commercials at present than historically and the offset between ABC and another source may be greater now than is reflected in the database. In this way, by adjusting the typical periods of time stored in the database, the media guidance application can maintain accurate estimations of a period of time that sources are typically out of synchronization for quicker resynchronization of the sources.

In some embodiments, the media guidance application may retrieve the typical period of time stored in the database and use it as the period of time that the two sources are offset (e.g., without detecting features in the media assets). For example, the media guidance application may determine that two users are 10 minutes into a media asset from two different sources and the sources are typically out of synchronization by 1 minute every 10 minutes. Accordingly, the media guidance application may, as described below, pause the media asset from the source that is further ahead for 1 minute, or transmit supplemental content for 1 minute.

The media guidance application may determine whether the period of time is greater than a threshold period of time. For example, the media guidance application may compare the difference in playback between the two sources of the media asset (e.g., period of time 126) to a threshold (e.g., 2 seconds). The media guidance application may determine whether values for the threshold and the period of time are in the same units and convert the units appropriately. The threshold may be any unit of time and may be variable depending on different user's preferences, as described further below.

In some embodiments, the media guidance application may determine the threshold period of time based on user preferences stored in a user profile. Specifically, the media guidance application may retrieve a user profile for a user associated with the user device receiving the media asset from the first source (e.g., a user device receiving portion 100). For example, the media guidance application may access the user profile either locally in storage or remotely at a server. The media guidance application may retrieve, from the user profile, a user preference. For example, the media guidance application may retrieve data from the user profile (e.g., by executing a database query language script such as SQL) corresponding to a user preference. For example the user preference may indicate attributes of a media asset (e.g., genres) where the user does not want to be resynchronized with another source. For example, a particular user may prefer a sports event be paused as opposed to supplemental content inserted, in which case the media guidance application may assign a large threshold period of time based on the user preference. The media guidance application may compare the user preference to a plurality of user preferences stored in a database, wherein each user preference of the plurality of user preferences corresponds to one of a plurality of threshold periods of time. For example, the media guidance application may query a database to determine whether a string of characters and/or other value matches the user preference. The media guidance application may determine that the user preference corresponds to a stored user preference in the database. For example, if the user preference for "sports" media content is a value of 10 out of 10 (10 being the highest) for preferring to pause, the media guidance application may determine an appropriate threshold value by matching the value to a value in the database. The media guidance application may then retrieve a first threshold period of time corresponding to the stored user preference as the threshold period of time. For example, the media guidance application may retrieve a threshold period of time (e.g., 10 seconds) associated with the user preference matched in the database.

The media guidance application, in response to determining that the period of time is greater than the threshold period of time, may transmit supplemental content to a user device receiving the media asset from the first source. Specifically, the media guidance application compares the period of time (e.g., period of time 126) to a plurality of durations stored in a supplemental content database, wherein each of a plurality of supplemental content stored in the supplemental content database is associated with a field containing one of the plurality of durations. For example the media guidance application may access a database containing a plurality of supplemental content either local in storage or remotely at a server. For example, the database may be structured as a table where each row contains information about a particular supplemental content, such as a type, a duration, and/or a pointer to a location in memory containing the supplemental content. In some embodiments the supplemental content may be stored in a different location than the database. The media guidance application may compare the value for the period of time (e.g., period of time 126) with durations of supplemental content stored in the database. In some embodiments, the media guidance application may transmit an instruction to the user device to generate for display a notification informing the user that they are receiving supplemental content while another user catches up to their playback position.

The media guidance application may determine that the period of time corresponds to a duration of the plurality of durations. For example, the media guidance application may determine, based on comparing the period of time (e.g., period of time 126) with durations associated with supplemental content in the database that a particular supplemental content has a matching duration (e.g., 20 seconds). Thus, by transmitting the particular supplemental content the media guidance application may resynchronize the media asset from the two sources.

As referred to herein, "supplemental content" should be understood as any content related to a media asset that supplements a current presentation of a media asset with media content related to the media asset. Supplemental content may include content featuring audio, video, and/or textual data associated with one or more playback points in a media asset. In some embodiments, supplemental content may include a textual summary of a portion of the media asset, audio content associated with a portion of the media asset, highlights associated with a portion of the media asset, etc., corresponding to one or more playback points in the media asset. In some embodiments, the supplemental content may be an advertisement or promotion tailored to users consuming the media asset. For example, the supplemental content may be an advertisement related to a team playing in the media asset (e.g., a football game).

The media guidance application may retrieve a first supplemental content associated with the duration. For example, the media guidance application may determine that a field associated with the first supplemental content contains a pointer to a location in storage where the supplemental content is stored. The media guidance application may then retrieve the supplemental content from the location in storage. Alternatively, the media guidance application may determine that a field associated with the first supplemental content contains an identifier of a location remote from the database (e.g., a URL) and may retrieve the supplemental content based on the identifier.

In some embodiments, the media guidance application may determine that the period of time does not correspond to any duration of the plurality of durations. For example, the media guidance application may determine, based on comparing the period of time (e.g., period of time 126) with durations associated with supplemental content in the database that no supplemental content has a matching duration (e.g., 20 seconds). The media guidance application may then determine that the period of time is within a threshold duration of a first duration of the plurality of durations. For example, while the media guidance application may not find an exact match between the period of time and a duration of a supplemental content, a duration of a supplemental content may be within a threshold amount of time (e.g., +/−1 second) of the period of time that the sources are out of synchronization. Specifically, if the period of time is 20 seconds and the threshold is 2 seconds, then the media guidance application may determine that a supplemental content with a duration of 21 seconds matches the period of time when accounting for the threshold. The media guidance application, in response to determining that the period of time is within the threshold duration of the first duration, determines whether the first duration is greater than the period of time. For example, the media guidance application may compare the duration with the period of time (e.g., 20 seconds) to determine whether it is greater (e.g., 21 seconds) or less (e.g., 19 seconds) than the period of time.

The media guidance application, in response to determining that the first duration is greater than the period of time, may remove a first frame of a second supplemental content associated with the first duration. For example, the media guidance application may remove a frame or multiple frames of the supplemental content such that the duration of the supplemental content matches the period of time (e.g., period of time 126). The media guidance application may analyze the audiovisual properties of frames of the supplemental content to determine appropriate frame(s) to remove (e.g., based on the frames not containing human speech or being entirely one color signifying a cut or scene change). The media guidance application, in response to determining that the first duration is not greater than the period of time, may insert a second frame into the second supplemental content associated with the first duration. For example, the media guidance application may insert a frame or multiple frames of the supplemental content such that the duration of the supplemental content matches the period of time (e.g., that the sources are out of synchronization). The media guidance application may analyze the audiovisual properties of frames of the supplemental content to determine appropriate places to duplicate and/or insert frame(s) (e.g., based on the frames not containing human speech or being entirely one color signifying a cut or scene change).

In some embodiments, the media guidance application may determine that the period of time does not correspond to any duration of the plurality of durations. For example, the media guidance application may determine, based on comparing the period of time (e.g., period of time 126) with durations associated with supplemental content in the database that no supplemental content has a matching duration (e.g., 20 seconds). The media guidance application may then determine that the period of time is greater than a threshold duration of each of the plurality of durations. For example, the media guidance application may determine that each supplemental content has a duration shorter than the period of time by a threshold amount. Specifically, if the period of time is 20 minutes and each supplemental content has a duration of roughly 30 seconds, the media guidance application may determine that the supplemental content are all greater than a threshold duration shorter than the period of time (e.g., if the threshold is 1 minute).

The media guidance application, in response to determining that the period of time (e.g., period of time 126) is greater than the threshold duration of each of the plurality of durations, may determine a subset of the plurality of durations, wherein a total duration of the subset corresponds to the period of time. For example, the media guidance application may retrieve a first supplemental content of a plurality of supplemental content in the database. The media guidance application may initialize and store a variable for the total duration of retrieved supplemental content. For example, the first supplemental content retrieved from the database may have a duration of 30 seconds. The media guidance application may update the variable by adding 30 seconds to the existing value. The media guidance application may then iteratively (e.g., via a for-loop) retrieve supplemental content until the variable for the total duration of retrieved supplemental content is within a threshold amount (e.g., corresponds) to the period of time that the two sources are out of synchronization. For example, the media guidance application may retrieve five 30-second long supplemental content clips if the period of time (e.g., period of time 126) that the two sources are out of synchronization is two and a half minutes. In some embodiments, the media guidance application may preferentially retrieve particular supplemental content. For example, the media guidance application may retrieve supplemental content indicated as high priority, or ranked highly, in the database before supplemental content indicated as low priority or ranked lower. Alternatively or additionally, the media guidance application may retrieve particular supplemental content based on user preferences stored in a user profile.

The media guidance application may then generate a custom supplemental content by combining each supplemental content associated with the subset of the plurality of durations. For example, the media guidance application may combine a plurality of supplemental content into a single custom supplemental content which has a duration corresponding to the period of time (e.g., period of time 126) that the two sources are out of synchronization. For example, the media guidance application may retrieve five supplemental content clips from the database and arrange them one after the other to form a longer cohesive supplemental content. In some embodiments, the media guidance application may arrange which supplemental content is transmitted to user equipment first based on the length of the supplemental content. For example, the media guidance application may transmit the longest supplemental content first. In some embodiments, the media guidance application may analyze the audiovisual content of frames at the beginning and end of each supplemental content to determine the order to transmit the plurality of supplemental content. For example, one supplemental content may end with 2 seconds of a single color (e.g., black) and a second supplemental content may start with 1 second of the same single color. Accordingly, the media guidance application may transmit the two supplemental contents one after the other such that the two different supplemental content clips appear as a single supplemental content (e.g., they seamlessly connect).

The media guidance application may store the media asset received from the first source in a buffer. For example, the media guidance application may store the portion of the media asset (e.g., portion 100) received while the supplemental content is being transmitted. The media guidance application may increase the size of a buffer that is already being used for the analysis of frames (e.g., frame 140) from the first source (as described above) if the buffer is dynamically allocated. If not, the media guidance application may create a new buffer for the media asset received while the supplemental content is being transmitted. In this way, the media guidance application ensures that none of the media asset is missed and that after the supplemental content is over, the media asset is resumed and synchronized with the other source that was at an earlier playback point.

The media guidance application may transmit the first supplemental content to a user device receiving the media asset from the first source instead of the media asset. For example, the media guidance application may transmit frames of the supplemental content to the user device receiving the media asset from the first source (e.g., which is ahead of the action of the media asset from the second source) in order to resynchronize the media asset from both sources. As described above, by transmitting the supplemental content when two sources are greater than a threshold period of time out of synchronization, the media guidance application may allow the two sources to be resynchronized without obscuring the media asset (e.g., by accelerating or decelerating playback).

The media guidance application may, upon completion of transmission of the first supplemental content, transmit the media asset from the buffer to the user device. For example, the media guidance application may determine that the entirety of the supplemental content has been transmitted and generated for display by a user device receiving the media asset from the first source. In order to minimize interruption to the user, the media guidance application may immediately transmit the media asset (e.g., portion 100) that was stored in the buffer to the user device. Alternatively or additionally, if the media guidance application determines that the media asset from the second source is still not resynchronized with the media asset from the first source, the media guidance application may delay transmission of the media asset for an additional period of time. For example, the media guidance application may determine that the difference between the two sources was 20 seconds prior to display of supplemental content and is now 0.5 seconds (e.g., due to additional delay from the second source or latency mismatches between sources). In response, the media guidance application may delay transmission of the media asset from the buffer to the user device receiving the media asset from the first source for the additional period of time (e.g., 0.5 seconds).

The media guidance application, in response to determining that the period of time is not greater than the threshold period of time, may pause, for the period of time, the media asset from the first source. For example, the media guidance application may determine that since the media asset is out of synchronization (e.g., based on period of time 126) between the two sources by less than the threshold period of time, supplemental content need not be displayed and the media asset can be paused from the source that is further ahead (e.g., user devices receiving the media asset from the source of portion 100). Specifically, the media guidance application may transmit an instruction to a user device to pause the media asset (e.g., if the user device has recording capabilities), or the media guidance application may store a buffer in the same manner as described above with respect to when supplemental content is transmitted. The media guidance application may transmit the same frame (e.g., frame 140) to the user device to simulate the user device pausing the media asset. In some embodiments, the media guidance application may transmit an instruction to the user device to generate for display a notification informing the user that the media asset is paused while another user catches up to their playback position.

In some embodiments, the media guidance application may determine whether the user device receiving the media asset from the first source has buffering capabilities. For example, the media guidance application may transmit a query to the user device for whether the user device contains storage for storing media assets (e.g., if the device can store portion 100). Alternatively or additionally, the media guidance application may transmit a query to the user device to identify an amount of storage available, if any. In this way, the media guidance application may determine whether the user device (a) has buffering capabilities and (b) has enough storage available to buffer the media asset for the period of time. The media guidance application may, in response to determining that the user device receiving the media asset from the first source does not have buffering capabilities, store the media asset received from the first source in the buffer. For example, as described above with respect to when supplemental content is transmitted to the user device, the media guidance application may store the portion of the media asset received from the first source while the media asset is being paused to allow the second source to reach the same point in the action (e.g., resynchronize, as described above). The media guidance application may transmit an identical frame (e.g., frame 140) from the media asset to the user device during the period of time (e.g., period of time 126). For example, the media guidance application may transmit a single frame to the user for the period of time to simulate the media asset being paused. In some embodiments, the single frame may not be a part of the media asset. For example, if two sources are out of synchronization in a sports event, the media guidance application may transmit a logo of a team playing, and/or scores related to the event (e.g., if the event is a football game, football scores from other games may be transmitted in the single frame).

The media guidance application, in response to determining that the user device receiving the media asset from the first source does have buffering capabilities, may transmit an instruction to the user device to pause the media asset for the period of time. For example, the media guidance application may transmit a data packet containing the instruction to the user device. The user device may receive the data packet and execute the instruction (e.g., to pause the media asset). The user device also may allocate storage to buffer the media asset received while the media asset is paused, such that when the period of time is over and the first and second sources are synchronized, playback can begin from the same point in the action (e.g., times 102 and 122 and aligned).

In some embodiments, the media guidance application may resynchronize a media asset from two different sources when a user pauses the media asset and resumes at a later time. For example, the user may pause (e.g., at time 102) the media asset on their television (e.g., where the media asset is received from a broadcast source) and resume on a mobile device (e.g., where the media asset is received from an over-the-top streaming service). In this situation, the pause point (e.g., time code) of the media asset from the first source may not be at the same point in the action as the second source (e.g., due to commercials from the broadcast source). Thus, if the media guidance application resumes from the same pause point (e.g., time code) from the second source, some action in the media asset may be skipped (e.g., if the second source didn't have the commercials). Accordingly, the media guidance application may detect a feature (e.g., feature 142) in the frame (e.g., frame 140) from the first source at the pause point. For example, as described above, the media guidance application may detect a face of a character or other feature by analyzing the audiovisual data of the frame and/or neighboring frames (in order to detect differences, such as lighting changes). The media guidance application may then search frames of the media asset received from the second source to detect the same feature, as described above. For example, if the media guidance application detected a face of actor Matt Damon at the pause point, then the media guidance application would search for his face in frames from the second source. Upon determining a frame that contains the feature, the media guidance application may resume the media asset from the corresponding time code from the second source, such that the user resumes from the same point in the action from which he or she was previously consuming the media asset from the first source.

Figure 2:
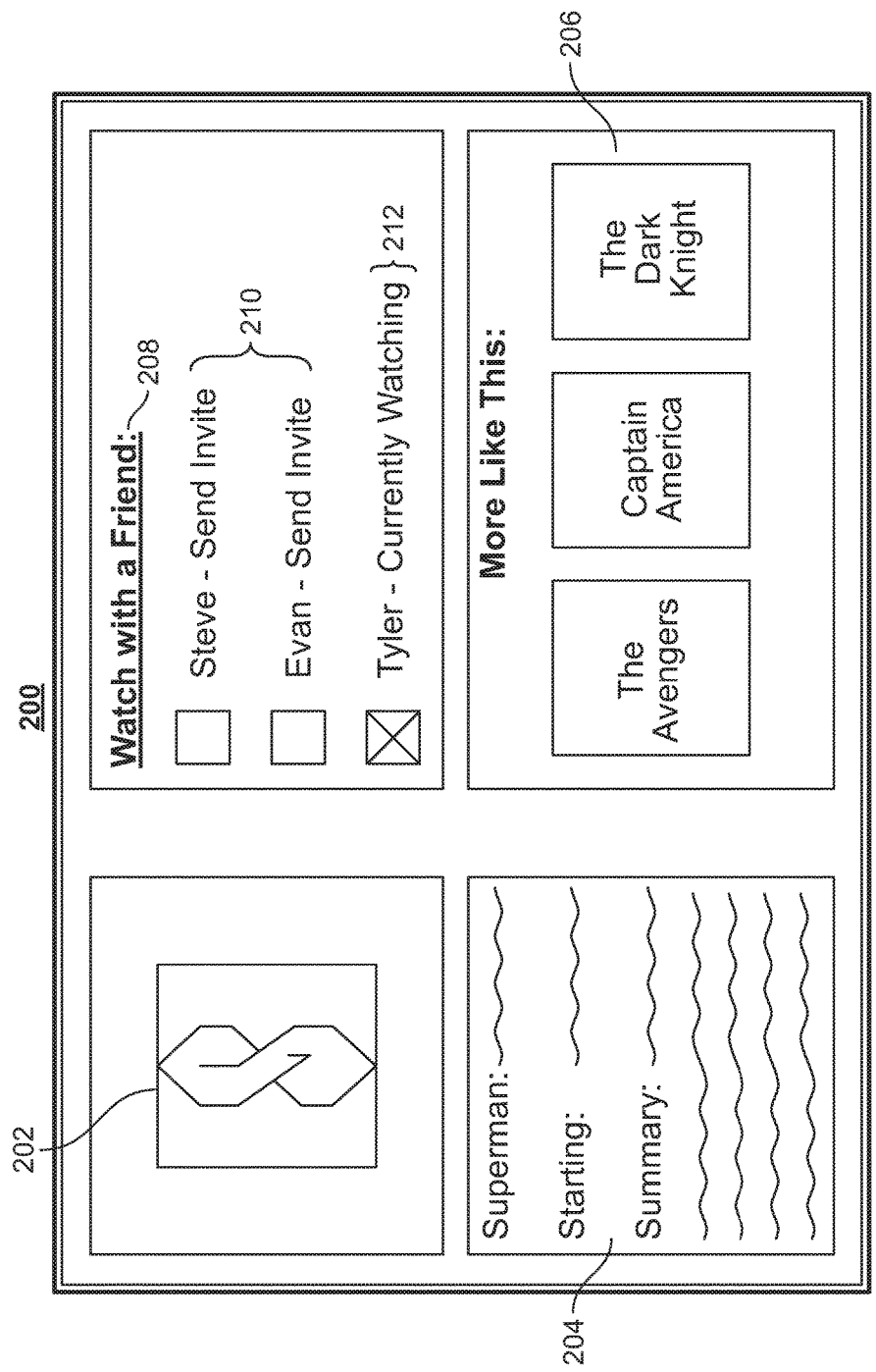
FIG. 2 shows an illustrative example of a display screen presenting options and information related to consuming a media asset, in accordance with some embodiments of the disclosure.

FIG. 2 shows an illustrative example of a display screen presenting options and information related to consuming a media asset, in accordance with some embodiments of the disclosure. For example, display 200 may include image 202 depicting a logo, scene, or other image associated with a media asset. Display 200 may also include information 204 identifying the media asset, actors, summary information and/or any other bibliographic data. Display 200 may also include similar programs, which may be selectable, to the media asset in a "More Like This" window. Display 200 also may include window 208 to watch the media asset with a friend. For example, window 208 may include a plurality of users 210 and 212 associated with the user. Some users (e.g., users 210) may not currently be consuming the media asset, while other users (e.g., user 212) may be consuming the media asset. Display 200 may include options to select one or more of users 210 and 212 to view the media asset with. Upon selection, the media guidance application may ensure that the users view the media asset from the same point in the action (e.g., different sources are synchronized), as described above with respect to FIG. 1. Display 200 may appear on one or more user devices (e.g., any of the devices listed in FIGS. 5-6 below). Moreover, the media guidance application may use one or more of the processes described in FIGS. 7-10 to generate display 200 or any of the features described therein.

In some embodiments, the media guidance application may receive a user selection from a first user to synchronize viewing of the media asset with a second user. For example, the media guidance application may generate for display a graphical user interface (e.g., display 200) prior to or during display of the media asset. The graphical user interface may contain identifiers of users (e.g., users 210 and 212) that the user associates with (e.g., friends, family etc.) based on social networking profiles of the user and/or manually entered by the user. The media guidance application may receive a user selection from the user to synchronize viewing of the media asset with another user (e.g., by the user selecting one or more of users 208 and 210 using a user input interface such as a remote control). The media guidance application may then determine that the first user is consuming the media asset from the first source and that the second user is consuming the media asset from the second source. For example the media guidance application may receive an indication of a source and a current playback point in the media asset from a user device of each user. For example, if the two users receive the media asset from the same source, the media guidance application may simply ensure that the time codes corresponding to playback points of the two users match. However, if the sources are different, than the media guidance application may need to synchronize the two sources (e.g., as described in FIG. 1). The media guidance application may transmit a request to a user device that the second user is using to consume the media asset to identify a source that the media asset is being received from. Alternatively or additionally, the media guidance application may access a data structure containing identifiers of user devices and status information for the user devices (e.g., what source each user device is currently receiving media from) and determine the source of the media asset for the first user and the second user.

The media guidance application may determine that the first source and the second source are different. For example, based on identifiers of the two sources being non-equivalent (e.g., "ABC" and "Netflix"), the media guidance application may determine that the media asset is being received from different sources by the users and may be out of synchronization. If the media asset is available to the media guidance application from both sources, the media guidance application, in response to determining that the first source and the second source are different, simultaneously receives the first portion of the media asset from the first source and the second portion of the media asset from the second source. For example, the media guidance application may receive portions of the media asset from the two sources to determine whether the two sources are synchronized or not, as described further below. If the media guidance application does not have access to the media asset from one or both sources, the media guidance application may instruct the user device to identify features in the media asset and transmit time stamps and indications of the features, and/or the media guidance application may instruct the user device to transmit fingerprints to the media guidance application which performs the analysis, as described above. In some embodiments, even if two users are viewing a media asset from the same source, due to latency the media asset may be out of synchronization for the two users. For example, the media guidance application may, in response to determining that the users are consuming the media asset from the same source, receive from respective user devices of the users an indication of a frame that was displayed by the user device at a specific time. If the frames are not the same, and/or are greater than a threshold difference, the media guidance application may determine that the media asset is out of synchronization and may perform the method described below to resynchronize the media asset.

In some embodiments, window 208 to watch the media asset with a friend may be presented by the media guidance application in response to a user selection of a media asset listing (e.g., a program listing, as described in FIG. 3 below). For example, the media asset listing may include an indication (e.g., a graphic) indicating that a friend is available to watch the media asset with and window 208 may be presented in response to a selection of the media asset listing. Alternatively or additionally, window 208 to watch the media asset with a friend may be presented by the media guidance application in response to a user selection of a group of media assets organized by a channel, a specific button to access window 208, or any other navigation selection related to selecting a media asset. Furthermore, the media guidance application may generate window 208 integrated into a display (e.g., display 200) or as an overlay or pop-up window upon receiving a user selection.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

Figure 3:
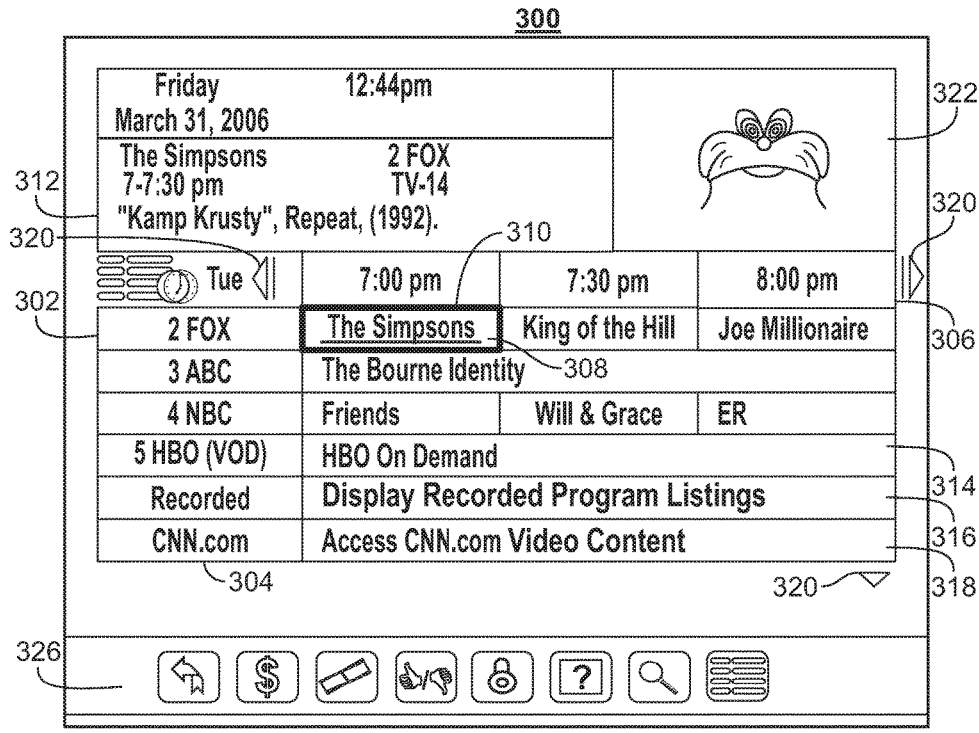
FIG. 3 shows an illustrative example of a display screen for use in accessing media content in accordance with some embodiments of the disclosure.
Figure 4:
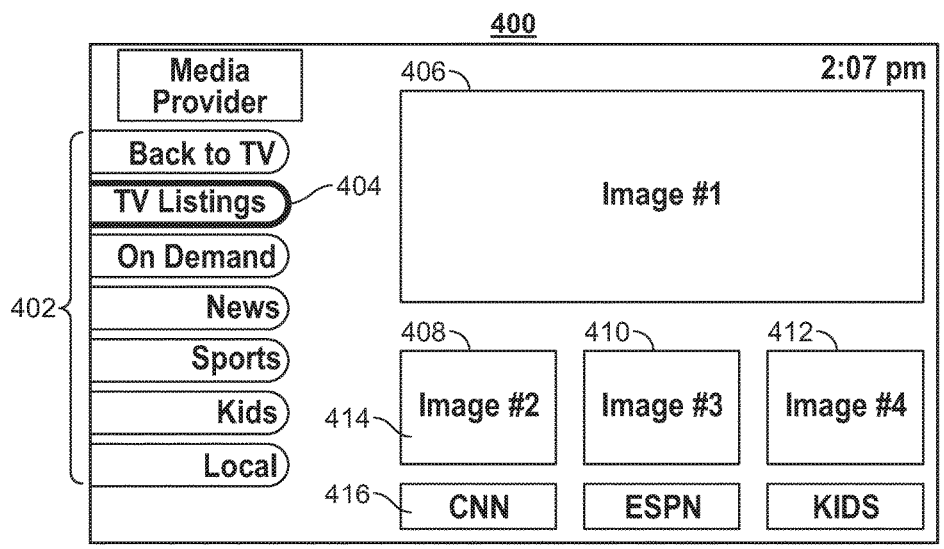
FIG. 4 shows another illustrative example of a display screen for use in accessing media content in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD). Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office. Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example. Yates, U.S. Patent Application Publication No. 2010/0153885, filed Nov. 12, 2009, which is hereby incorporated by reference herein in its entirety.

Figure 5:
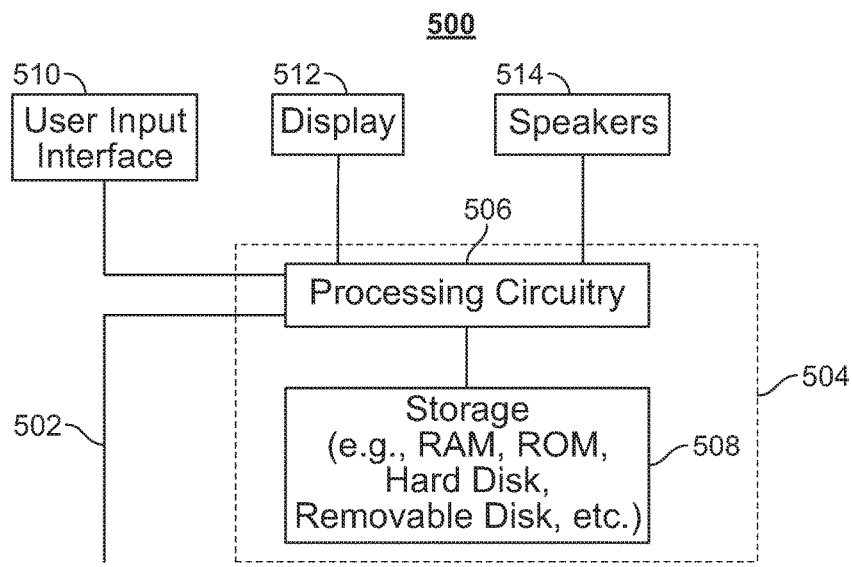
FIG. 5 is a block diagram of an illustrative user equipment device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D.

A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
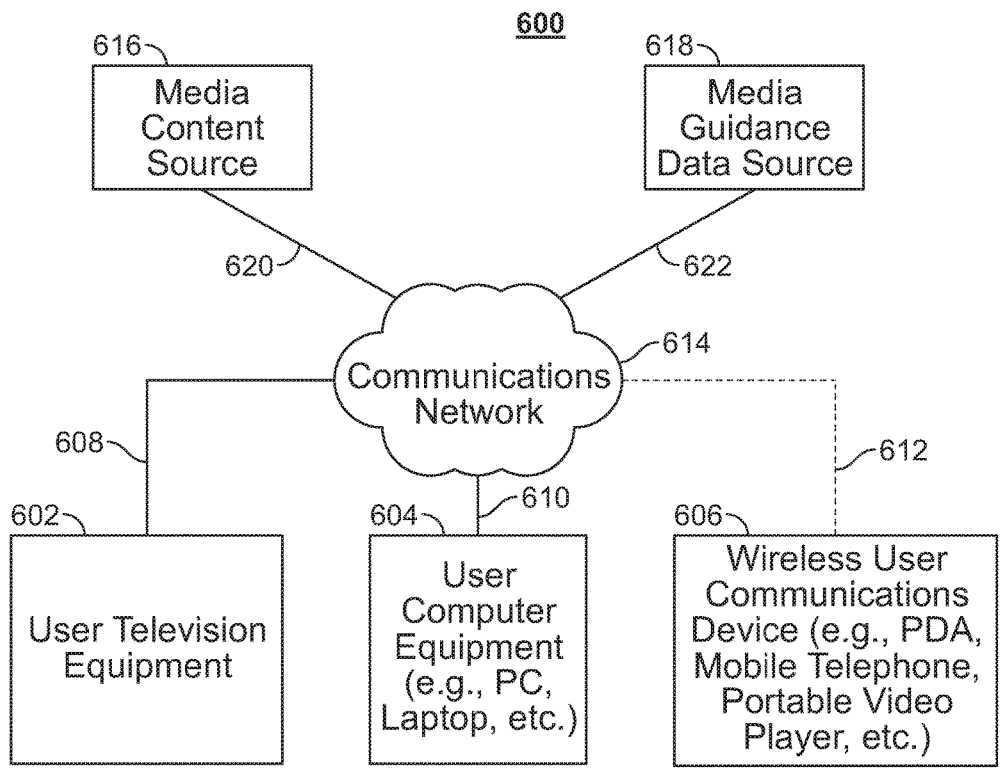
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
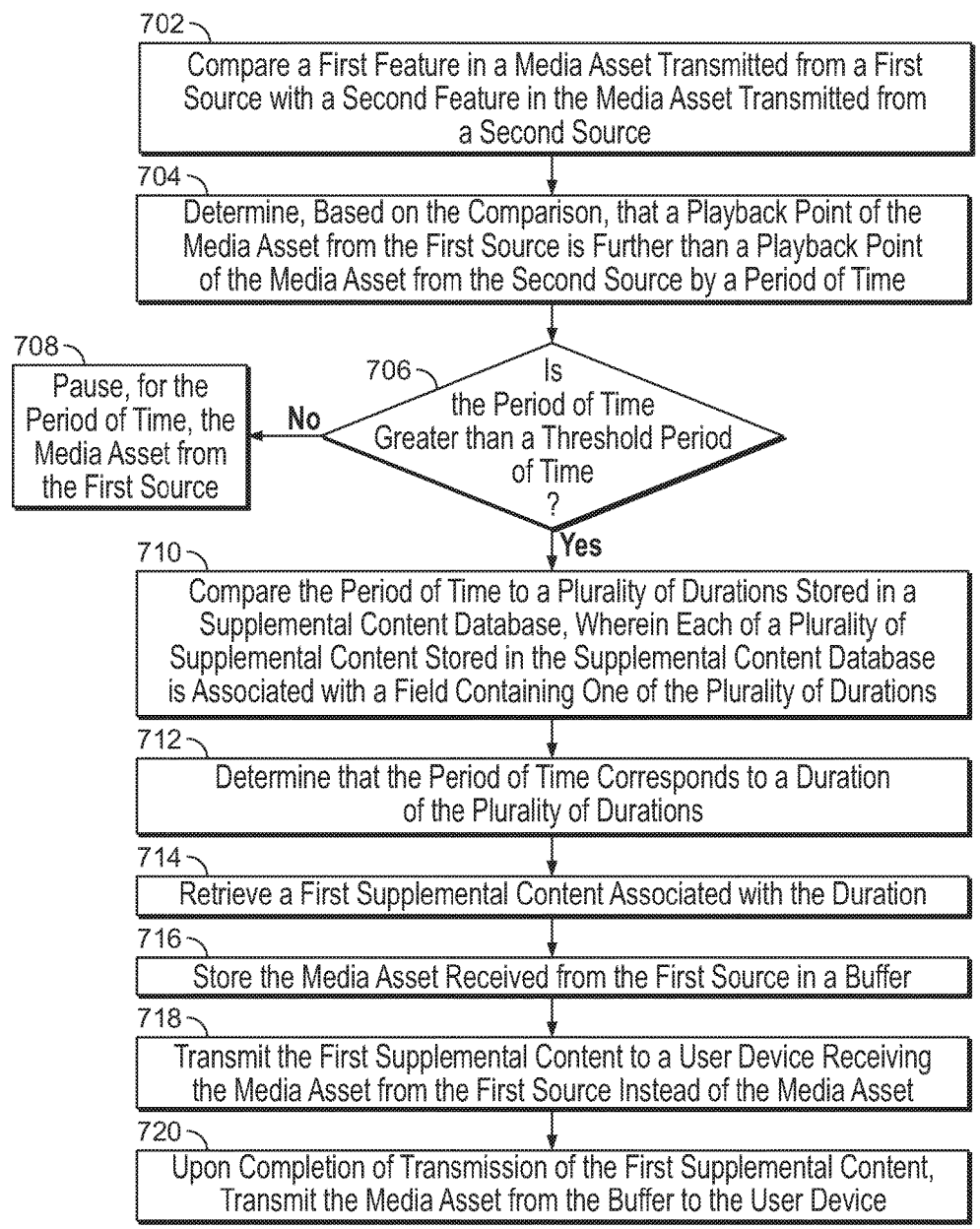
FIG. 7 is a flowchart of illustrative steps for synchronizing playback of media assets from multiple sources, in accordance with some embodiments of the disclosure.

FIG. 7 is a flowchart of illustrative steps for synchronizing playback of media assets from multiple sources, in accordance with some embodiments of the disclosure. For example, a media guidance application implementing process 700 may be executed by control circuitry 504 (FIG. 5). It should be noted that process 700 or any step thereof could be performed on, or provided by, any of the devices shown in FIGS. 5-6.

Process 700 begins with 702, where the media guidance application simultaneously compares (e.g., via control circuitry 504 (FIG. 5)) a first feature in a media asset transmitted from a first source with a second feature in the media asset transmitted from a second source. For example, the media guidance application may determine (e.g., via control circuitry 504 (FIG. 5)) whether the media asset can be received from the first source (e.g., content source 616 (FIG. 6)) and/or the second source (e.g., based on permissions). If the media guidance application can receive the media asset from a source, the media guidance application receives (e.g., via control circuitry 504 (FIG. 5)) frames of the media asset. The media guidance application may analyze (e.g., via control circuitry 504 (FIG. 5)) the audiovisual content of frames of the media asset received from the first and second sources. Specifically, the media guidance application may detect (e.g., via control circuitry 504 (FIG. 5)) a particular feature, such as a character, a sound, a distinctive object such as a car, or any other audio or visual feature in the media asset. Based on detecting a particular feature in the media asset received from one of the sources, the media guidance application may search (e.g., via control circuitry 504 (FIG. 5)) for that same feature in frames received from the other source. For example, the media guidance application may find (e.g., via control circuitry 504 (FIG. 5)) a particular set of instructions for generating a face in pixel coordinates, or audio of particular frequencies and intensities in a data packet for the media asset from one source and may search for the same data in data packets received from the other source. Alternatively or additionally, the media guidance application may determine (e.g., via control circuitry 504 (FIG. 5)) that while the two features are not identical they correspond (e.g., within a margin of error) or that the features, while different, indicate a particular difference in time that can be used to resynchronize the sources (e.g., the time remaining in a sporting event).

Process 700 continues to 704, where the media guidance application determines (e.g., via control circuitry 504 (FIG. 5)), based on the comparison, that a playback point of the media asset from the first source is further than a playback point of the media asset from the second source by a period of time. For example, the media guidance application may determine (e.g., via control circuitry 504 (FIG. 5)) a frame index (e.g., a time code) for the frames where the first feature and the second feature appear. Based on the frame rate (e.g., 24 frames per second) or alternatively a time code (e.g., which indicates hours:minutes:seconds:frame) the media guidance application may determine (e.g., via control circuitry 504 (FIG. 5)) whether the first feature appears before the second feature or vice versa. The media guidance application may then determine (e.g., via control circuitry 504 (FIG. 5)) whether the first source or the second source (e.g., one of two content sources 616 (FIG. 6)) is at a further playback point (e.g., in the media asset itself, irrespective of any content added in such as advertisements). Based on the difference between the time codes or frame indexes, the media guidance application may determine (e.g., via control circuitry 504 (FIG. 5)) the period of time that the two sources are out of synchronization.

Process 700 continues to 706, where the media guidance application determines (e.g., via control circuitry 504 (FIG. 5)) if the period of time is greater than a threshold period of time. For example, the media guidance application may compare (e.g., via control circuitry 504 (FIG. 5)) the difference in playback between the two sources (e.g., two of content source 616 (FIG. 6)) of the media asset to a threshold (e.g., 2 seconds). The media guidance application may determine (e.g., via control circuitry 504 (FIG. 5)) whether values for the threshold and the period of time are in the same units and convert the units appropriately. The threshold may be any unit of time and may be variable depending on different user's preferences, as described further with respect to FIG. 9.

If, at 706, the media guidance application determines that the period of time is not greater than the threshold period of time, process 700 continues to 708, where the media guidance application pauses (e.g., via control circuitry 504 (FIG. 5)), for the period of time, the media asset from the first source. For example, the media guidance application may determine (e.g., via control circuitry 504 (FIG. 5)) that since the media asset is out of synchronization between the two sources (e.g., two of content source 616 (FIG. 6)) by less than the threshold period of time, supplemental content need not be displayed and the media asset can be paused from the source that is further ahead. Specifically, the media guidance application may transmit (e.g., via control circuitry 504 (FIG. 5)) an instruction to a user device (e.g., any of user equipment discussed with respect to FIGS. 5-6) to pause the media asset (e.g., if the user device has recording capabilities), or the media guidance application may store a buffer (e.g., in storage 508 (FIG. 5)). The media guidance application may transmit (e.g., via control circuitry 504 (FIG. 5)) the same frame to the user device to simulate the user device pausing the media asset.

If, at 706, the media guidance application determines that the period of time is greater than the threshold period of time, process 700 continues to 710, where the media guidance application compares (e.g., via control circuitry 504 (FIG. 5)) the period of time to a plurality of durations stored in a supplemental content database, wherein each of a plurality of supplemental content stored in the supplemental content database is associated with a field containing one of the plurality of durations. For example the media guidance application may access (e.g., via control circuitry 504 (FIG. 5)) a database (e.g., locally in storage 508 (FIG. 5) or remote at media guidance data source 618 accessible via communications network 614 (FIG. 6)) containing a plurality of supplemental content. For example, the database may be structured as a table where each row contains information about a particular supplemental content, such as a type, a duration, and/or a pointer to a location in memory containing the supplemental content. In some embodiments the supplemental content may be stored in a different location than the database (e.g., locally in storage 508 (FIG. 5) or remote at media guidance data source 618 accessible via communications network 614 (FIG. 6)). The media guidance application may compare (e.g., via control circuitry 504 (FIG. 5)) the value for the period of time (e.g., the offset between the two sources) with durations of supplemental content stored in the database.

Process 700 continues to 712, where the media guidance application determines (e.g., via control circuitry 504 (FIG. 5)) that the period of time corresponds to a duration of the plurality of durations. For example, the media guidance application may determine (e.g., via control circuitry 504 (FIG. 5)), based on comparing the period of time (e.g., 20 seconds) with durations associated with supplemental content in the database (e.g., stored locally in storage 508 (FIG. 5) or remote at media guidance data source 618 accessible via communications network 614 (FIG. 6)) that a particular supplemental content has a matching duration (e.g., 20 seconds). Thus, by transmitting the particular supplemental content the media guidance application may resynchronize (e.g., via control circuitry 504 (FIG. 5)) the media asset from the two sources (e.g., two of content source 616 (FIG. 6)).

Process 700 continues to 714, where the media guidance application retrieves (e.g., via control circuitry 504 (FIG. 5)) a first supplemental content associated with the duration. For example, the media guidance application may determine (e.g., via control circuitry 504 (FIG. 5)) that a field associated with the first supplemental content contains a pointer to a location in storage (e.g., in storage 508 (FIG. 5)) where the supplemental content is stored. The media guidance application may then retrieve (e.g., via control circuitry 504 (FIG. 5)) the supplemental content from the location in storage. Alternatively, the media guidance application may determine (e.g., via control circuitry 504 (FIG. 5)) that a field associated with the first supplemental content contains an identifier of a location remote (e.g., at media guidance data source 618 accessible via communications network 614 (FIG. 6)) from the database (e.g., a URL) and may retrieve the supplemental content based on the identifier.

Process 700 continues to 716, where the media guidance application stores (e.g., via control circuitry 504 (FIG. 5)) the media asset received from the first source in a buffer. For example, the media guidance application may store (e.g., in storage 508 (FIG. 5) and/or remote at media guidance data source 618 accessible via communications network 614 (FIG. 6)) the portion of the media asset received while the supplemental content is being transmitted. The media guidance application may increase (e.g., via control circuitry 504 (FIG. 5)) the size of a buffer that is already being used for the analysis of frames from the first source (as described above) if the buffer is dynamically allocated. If not, the media guidance application may create (e.g., via control circuitry 504 (FIG. 5)) a new buffer for the media asset received while the supplemental content is being transmitted. In this way, the media guidance application ensures that none of the media asset is missed and that after the supplemental content is over, the media asset is resumed and synchronized with the other source (e.g., content source 616 (FIG. 6)) that was at an earlier playback point.

Process 700 continues to 718, where the media guidance application transmits (e.g., via control circuitry 504 (FIG. 5)) the first supplemental content to a user device receiving the media asset from the first source instead of the media asset. For example, the media guidance application may transmit (e.g., via control circuitry 504 (FIG. 5)) frames of the supplemental content to the user device (e.g., any of user equipment discussed with respect to FIGS. 5-6) receiving the media asset from the first source (e.g., which is ahead of the action of the media asset from the second source) in order to resynchronize the media asset from both sources (e.g., two of content source 616 (FIG. 6)).

Process 700 continues to 720, where the media guidance application, upon completion of transmission of the first supplemental content, transmits (e.g., via control circuitry 504 (FIG. 5)) the media asset from the buffer to the user device. For example, the media guidance application may determine (e.g., via control circuitry 504 (FIG. 5)) that the entirety of the supplemental content has been transmitted and generated for display (e.g., on display 512 (FIG. 5)) by a user device (e.g., any of user equipment discussed with respect to FIGS. 5-6) receiving the media asset from the first source (e.g., content source 616 (FIG. 6)). In order to minimize interruption to the user, the media guidance application may immediately transmit (e.g., via control circuitry 504 (FIG. 5)) the media asset that was stored in the buffer to the user device.

Figure 8:
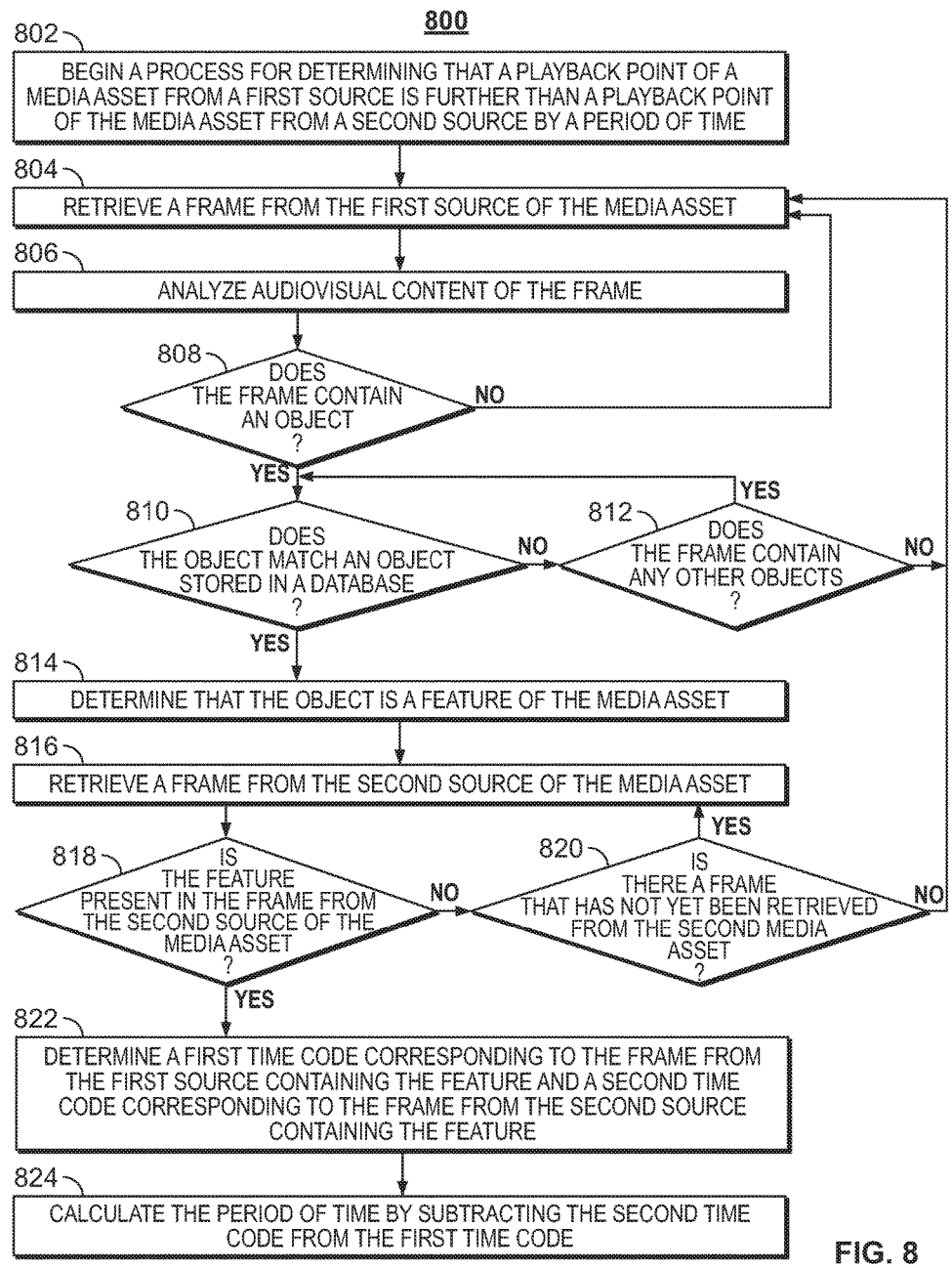
FIG. 8 is a flowchart of illustrative steps for determining that a playback point of a media asset from a first source is further than a playback point of the media asset from a second source by a period of time, in accordance with some embodiments of the disclosure.

FIG. 8 is a flowchart of illustrative steps for determining that a playback point of a media asset from a first source is further than a playback point of the media asset from a second source by a period of time, in accordance with some embodiments of the disclosure. For example, a media guidance application implementing process 800 may be executed by control circuitry 504 (FIG. 5). It should be noted that process 800 or any step thereof could be performed on, or provided by, any of the devices shown in FIGS. 5-6. Process 800 starts at 802, where the media guidance application begins (e.g., via control circuitry 504 (FIG. 5)) a process for determining that a playback point of a media asset from a first source is further than a playback point of the media asset from a second source by a period of time. For example, the media guidance application may initialize the necessary variables and execute (e.g., via control circuitry 504 (FIG. 5)) a program script calling a particular method to execute process 800.

Process 800 continues to 804, where the media guidance application retrieves (e.g., via control circuitry 504 (FIG. 5)) a frame from the first source of the media asset. For example, the media guidance application may receive (e.g., via control circuitry 504 (FIG. 5)), from a first source (e.g., content source 616 (FIG. 6)), data packets containing audiovisual information associated with the media asset at particular points in time (e.g., indexed by time codes). The data packets may contain audiovisual information for a single frame or a plurality of frames of the media asset from the source.

Process 800) continues to 806, where the media guidance application analyzes (e.g., via control circuitry 504 (FIG. 5)) audiovisual content of the frame. For example, the media guidance application may determine (e.g., via control circuitry 504 (FIG. 5)) the frequencies and amplitude of audio for a given frame, patterns of pixels that will be displayed for the frame, and other audiovisual information in the frame to determine if a feature is present in the frame.

Process 800 continues to 808, where the media guidance application determines (e.g., via control circuitry 504 (FIG. 5)) if the frame contains an object. For example, the media guidance application may determine (e.g., via control circuitry 504 (FIG. 5)) that a particular set of instructions for generating pixels forms a pattern that is likely a face of a character. As another example, the media guidance application may detect (e.g., via control circuitry 504 (FIG. 5)) a particular frequency of audio that corresponds to human speech. In this way the media guidance application determines whether particular frames have objects (e.g., based on a rule set) that are likely features as a filter in order to avoid comparing every possible group of pixels for every frame with features in a database (e.g., in storage 508 (FIG. 5) and/or remote at media guidance data source 618 accessible via communications network 614 (FIG. 6)), which may be computationally intensive. If, at 808, the media guidance application determines that the frame does not contain an object, process 800 returns to 804, where the media guidance application retrieves (e.g., via control circuitry 504 (FIG. 5)) another frame from the first source of the media asset. For example, the media guidance application may determine (e.g., via control circuitry 504 (FIG. 5)) that a given frame does not contain an object and in response retrieves a new frame to analyze for objects from the first source (e.g., content source 616 (FIG. 6)). In this way, the media guidance application iterates (e.g., via a for-loop) through frames received from the first source in order to detect frames that have an object which can be used for synchronization purposes.

If, at 808, the media guidance application determines that the frame contains an object, process 800 continues to 810, where the media guidance application determines (e.g., via control circuitry 504 (FIG. 5)) if the object matches an object stored in a database. For example, the media guidance application may access (e.g., via control circuitry 504 (FIG. 5)) a database (e.g., in storage 508 (FIG. 5) and/or remote at media guidance data source 618 accessible via communications network 614 (FIG. 6)) containing known objects for the media asset. The media guidance application may determine (e.g., via control circuitry 504 (FIG. 5)) that the object matches a first object of the plurality of objects. For example, the media guidance application may compare (e.g., via control circuitry 504 (FIG. 5)) the data corresponding to the object (e.g., pixel coordinates or audio information) with data stored in the database to determine whether the object matches a known object in the media asset.

If, at 810, the media guidance application determines that the object does not match an object in the database, process 800 continues to 812, where the media guidance application determines (e.g., via control circuitry 504 (FIG. 5)) if the frame contains any other objects. For example, the media guidance application may execute (e.g., via control circuitry 504 (FIG. 5)) a for-loop to iteratively compare every object in a given frame to features in the database (e.g., in storage 508 (FIG. 5) and/or remote at media guidance data source 618 accessible via communications network 614 (FIG. 6)) to determine whether the frame contains a feature. If, at 812, the media guidance application determines that the frame does not contain another object, process 800 returns to 804, where the media guidance application retrieves (e.g., via control circuitry 504 (FIG. 5)) another frame from the first source of the media asset. For example, the media guidance application may determine (e.g., via control circuitry 504 (FIG. 5)) that a given frame does not contain an object and in response retrieves a new frame to analyze for objects from the first source (e.g., content source 616 (FIG. 6)). In this way, the media guidance application iterates (e.g., via a for-loop) through frames received from the first source in order to detect frames that have an object which can be used for synchronization purposes.

If, at 812, the media guidance application determines that the frame does contain another object, process 800 returns to 810, where the media guidance application determines (e.g., via control circuitry 504 (FIG. 5)) if the object matches an object stored in a database. For example, as discussed above, the media guidance application may access (e.g., via control circuitry 504 (FIG. 5)) a database (e.g., in storage 508 (FIG. 5) and/or remote at media guidance data source 618 accessible via communications network 614 (FIG. 6)) containing known objects for the media asset. The media guidance application may compare (e.g., via control circuitry 504 (FIG. 5)) data associated with the object with data in the database to determine whether the object is a feature of the media asset.

If, at 810, the media guidance application determines that the object does match an object in the database, process 800 continues to 814, where the media guidance application determines (e.g., via control circuitry 504 (FIG. 5)) that the object is a feature of the media asset. For example, once a match is determined, the media guidance application may determine (e.g., via control circuitry 504 (FIG. 5)) that the object is a feature in the media asset and may search the frames from the other source (e.g., another content source 616 (FIG. 6)) to find the time code where the same feature appears to determine whether the media assets are synchronized, as described further below.

Process 800 continues to 816, where the media guidance application retrieves (e.g., via control circuitry 504 (FIG. 5)) a frame from the second source of the media asset. For example, the media guidance application may receive (e.g., via control circuitry 504 (FIG. 5)), from a second source (e.g., another content source 616 (FIG. 6)), data packets containing audiovisual information associated with the media asset at particular points in time (e.g., indexed by time codes). The data packets may contain audiovisual information for a single frame or a plurality of frames of the media asset from the source.

Process 800 continues to 818, where the media guidance application determines (e.g., via control circuitry 504 (FIG. 5)) if the feature is present in the frame from the second source of the media asset. For example, the media guidance application may, similar to determining the first feature described above with respect to 806 and 808, determine (e.g., via control circuitry 504 (FIG. 5)) that a particular set of instructions for generating pixels of a second frame correspond to instructions to generate a face of an actor for the first time in the media asset. The media guidance application may compare (e.g., via control circuitry 504 (FIG. 5)) audiovisual properties of the first feature with the audiovisual properties of the second feature. For example, the media guidance application may compare (e.g., via control circuitry 504 (FIG. 5)) pixel coordinates, audio information, or other audiovisual data defining the two features to determine whether the features are the same. The media guidance application may determine (e.g., via control circuitry 504 (FIG. 5)), based on comparing the audiovisual properties of the first feature with the audiovisual properties of the second feature, that the second feature corresponds to the first feature.

If, at 818, the media guidance application determines that the feature is not present in the frame, process 800 continues to 820, where the media guidance application determines (e.g., via control circuitry 504 (FIG. 5)) if there is a frame that has not yet been retrieved from the second media asset. For example, the media guidance application may iteratively search (e.g., via control circuitry 504 (FIG. 5)) through frames of the media asset received from the second source (e.g., another content source 616 (FIG. 6)) for the feature. The media guidance application may search (e.g., via control circuitry 504 (FIG. 5)) frames corresponding to time codes before and after the time code where the first feature was detected in the first portion (e.g., from the first source). If, at 820, the media guidance application determines (e.g., via control circuitry 504 (FIG. 5)) that there is a frame that has not yet been retrieved from the second media asset, process 800 returns to 816, where the media guidance application retrieves (e.g., via control circuitry 504 (FIG. 5)) the frame from the second source of the media asset. For example, the media guidance application may execute (e.g., via control circuitry 504 (FIG. 5)) a for-loop to iterate through every frame currently stored in a buffer (e.g., stored in storage 508) from the second source. The media guidance application may determine (e.g., via control circuitry 504 (FIG. 5)) whether the buffer contains every frame for the media asset from the second source. If not every frame has been retrieved, the media guidance application may retrieve (e.g., via control circuitry 504 (FIG. 5)) every frame from the second source, if they are available.

If, at 820, the media guidance application determines that there are no frames that have not yet been retrieved from the second media asset, process 800 returns to 804, where the media guidance application retrieves (e.g., via control circuitry 504 (FIG. 5)) a frame from the first source of the media asset. For example, the media guidance application may determine (e.g., via control circuitry 504 (FIG. 5)) that the feature can not be found in frames currently stored in a buffer (e.g., stored in storage 508) from the second source (e.g., another content source 616 (FIG. 6)). In some embodiments, the media guidance application may determine (e.g., via control circuitry 504 (FIG. 5)) that since the feature can not be found in the currently available frames, there are no frames that have not been analyzed and may retrieve another frame from the first source to find a new feature to use to synchronize the media assets. In other embodiments, the media guidance application may retrieve (e.g., via control circuitry 504 (FIG. 5)) every frame of the media asset from the second source before returning to 804. For example, the feature may be obscured from the second source and the media guidance application may not be able to find it (and thus can not determine the offset in the action between the two sources, as discussed above with respect to FIG. 7). In these situations, the media guidance application can not use the feature detected from the first source to synchronize the two sources since the feature cannot be found in the frames that are available to the second source or in any frame from the second source. Accordingly, the media guidance application attempts to find a new feature from the first source (e.g., content source 616 (FIG. 6)) to use to synchronize the two sources (e.g., returns to 804).

If, at 818, the media guidance application determines that the feature is present in the frame, process 800 continues to 822, where the media guidance application determines (e.g., via control circuitry 504 (FIG. 5)) a first time code corresponding to the frame from the first source containing the feature and a second time code corresponding to the frame from the second source containing the feature. For example, the media guidance application may determine (e.g., via control circuitry 504 (FIG. 5)) that a particular signal or header in data packets associated with the frame from the first source (e.g., content source 616 (FIG. 6)) where the feature was detected and associated with the frame from the second source (e.g., another content source 616 (FIG. 6)) where the feature was detected contain binary coded decimal values corresponding to time indices of frames and retrieve those values. The media guidance application converts (e.g., via control circuitry 504 (FIG. 5)) each binary coded decimal value to a corresponding decimal value corresponding to the first time code. For example, the media guidance application may determine (e.g., via control circuitry 504 (FIG. 5)) that four particular bits relating to one value in the time code are "1001" which may correspond to the value "9" in the time code. The time code may be a numerical representation of the number of frames of the movie presented at a particular point in time. For example, the media guidance application may retrieve (e.g., via control circuitry 504 (FIG. 5)) the time code (00:30:00:00) corresponding to (hour:minute:second:frame) for the frame with the feature from the first source and may retrieve the time code (00:35:00:00) for the frame with the feature from the second source.

Process 800 continues to 824, where the media guidance application calculates (e.g., via control circuitry 504 (FIG. 5)) the period of time by subtracting the second time code from the first time code. For example, the media guidance application may subtract (e.g., via control circuitry 504 (FIG. 5)) each respective value of the second time code from the first time code (e.g., the minutes from the second time code are subtracted from the minutes of the first time code) to compute a difference time code, which can then be converted into a single unit of time (e.g., seconds).

Figure 9:
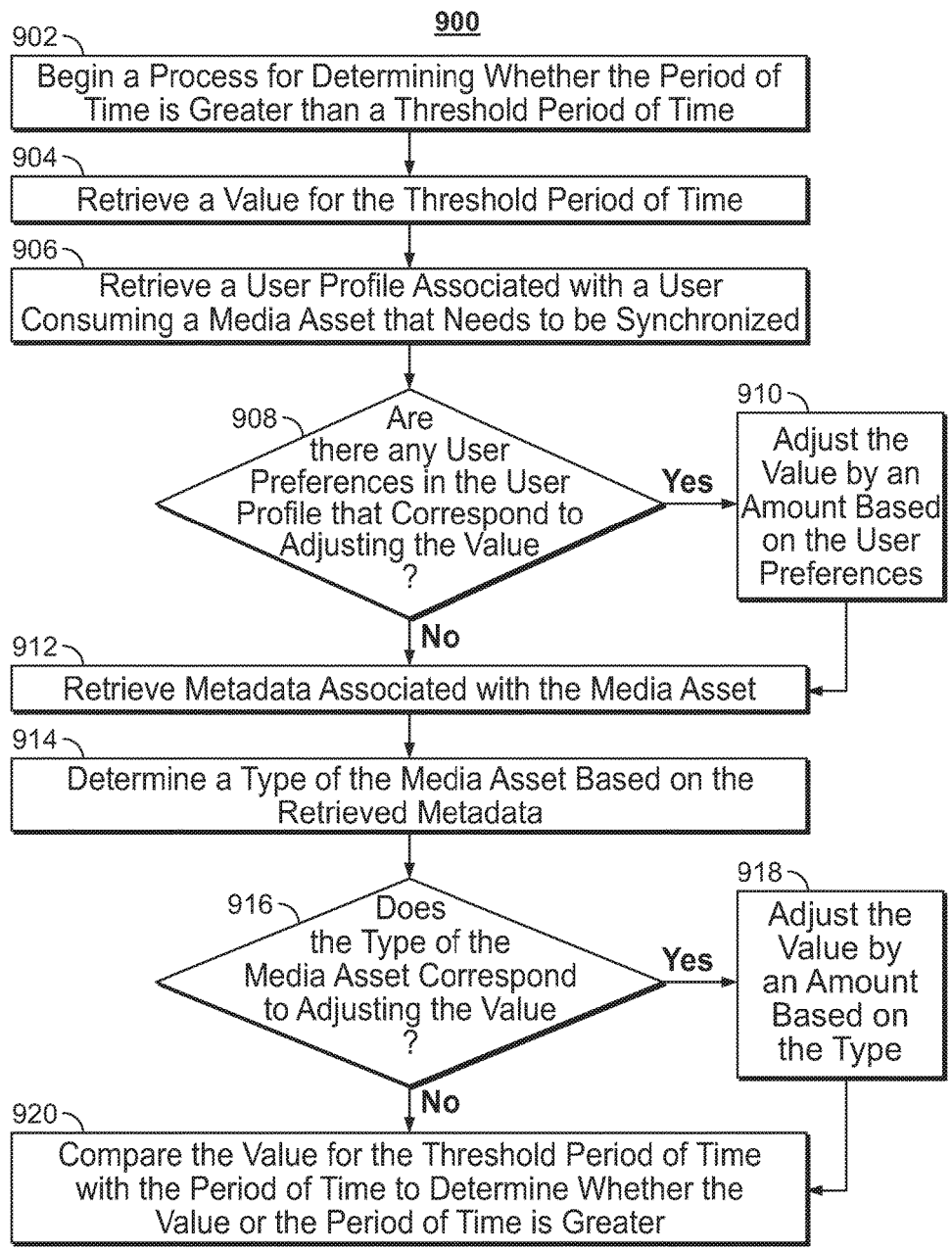
FIG. 9 is a flowchart of illustrative steps for determining whether the period of time is greater than a threshold period of time, in accordance with some embodiments of the disclosure.

FIG. 9 is a flowchart of illustrative steps for determining whether the period of time is greater than a threshold period of time, in accordance with some embodiments of the disclosure. For example, a media guidance application implementing process 900 may be executed by control circuitry 504 (FIG. 5). It should be noted that process 900 or any step thereof could be performed on, or provided by, any of the devices shown in FIGS. 5-6. Process 900 starts at 902, where the media guidance application begins (e.g., via control circuitry 504 (FIG. 5)) a process for determining whether the period of time is greater than a threshold period of time. For example, the media guidance application may initialize the necessary variables and execute (e.g., via control circuitry 504 (FIG. 5)) a program script calling a particular method to execute process 900.

Process 900 continues to 904, where the media guidance application retrieves (e.g., via control circuitry 504 (FIG. 5)) a value for the threshold period of time. For example, the media guidance application may retrieve (e.g., via control circuitry 504 (FIG. 5)) a default value for the threshold period of time (e.g., from storage 508 (FIG. 5)). The threshold period of time may be any unit of time that can be compared to the period of time that the two sources (e.g., two of content source 616 (FIG. 6)) are out of synchronization. The default value for the threshold may be adjusted based on specific preferences of the user and/or a type of the media asset, as discussed below.

Process 900 continues to 906, where the media guidance application retrieves (e.g., via control circuitry 504 (FIG. 5)) a user profile associated with a user consuming a media asset that needs to be synchronized. For example, the media guidance application may access (e.g., via control circuitry 504 (FIG. 5)) the user profile associated with a user and/or user device receiving the media asset (e.g., in storage 508 (FIG. 5) and/or remote at media guidance data source 618 accessible via communications network 614 (FIG. 6)). The media guidance application may retrieve (e.g., via control circuitry 504 (FIG. 5)) the user profile and/or data in the user profile and determine whether to adjust the value for the threshold period of time, as discussed further below.

Process 900 continues to 908, where the media guidance application determines (e.g., via control circuitry 504 (FIG. 5)) if there are any user preferences in the user profile that correspond to adjusting the value. For example, the media guidance application may retrieve (e.g., via control circuitry 504 (FIG. 5)) data from the user profile (e.g., by executing a database query language script such as SQL) corresponding to a user preference. For example the user preference may indicate attributes of a media asset (e.g., genres) where the user does not want to be resynchronized with another source (e.g., content source 616 (FIG. 6)). For example, the media guidance application may query (e.g., via control circuitry 504 (FIG. 5)) a database (e.g., in storage 508 (FIG. 5) and/or remote at media guidance data source 618 accessible via communications network 614 (FIG. 6)) to determine whether a string of characters and/or other value matches the user preference. The media guidance application may determine (e.g., via control circuitry 504 (FIG. 5)) that the user preference corresponds to a stored user preference in the database. For example, if the user preference for "sports" media content is a value of 10 out of 10 (10 being the highest) for preferring to pause, the media guidance application may determine an appropriate threshold value by matching the value to a value in the database.

If, at 908, the media guidance application determines there is a user preference that corresponds to adjusting the value, process 900 continues to 910, where the media guidance application adjusts (e.g., via control circuitry 504 (FIG. 5)) the value by an amount based on the user preferences. For example, the media guidance application may retrieve (e.g., via control circuitry 504 (FIG. 5)) a threshold period of time (e.g., 10 seconds) associated with the user preference matched in the database (e.g., in storage 508 (FIG. 5) and/or remote at media guidance data source 618 accessible via communications network 614 (FIG. 6)). The media guidance application may update (e.g., via control circuitry 504 (FIG. 5)) the value for the threshold period of time by adding, averaging, or performing any other mathematical operation on the default value and the retrieved threshold corresponding to the matched user preference. Process 900 then continues to 912, described further below.

If, at 908, the media guidance application determines there is not a user preference that corresponds to adjusting the value, process 900 continues to 912, where the media guidance application retrieves (e.g., via control circuitry 504 (FIG. 5)) metadata associated with the media asset. For example, the media guidance application may retrieve (e.g., via control circuitry 504 (FIG. 5)) an indication of a genre, actor, director, or other metadata associated with the media asset (e.g., from storage 508 (FIG. 5) or from media guidance data source 618 via communications network 614 (FIG. 6)).

Process 900 continues to 914, where the media guidance application determines (e.g., via control circuitry 504 (FIG. 5)) a type of the media asset based on the retrieved metadata. For example, a type of media asset may be based on any single attribute of the media asset (e.g., genre, director, and/or actor) or any group that comprises a combination of single attributes (e.g., a group for "chick flicks" may be associated with the genres "romance" and "comedy").

Process 900 continues to 916, where the media guidance application determines (e.g., via control circuitry 504 (FIG. 5)) if the type of the media asset corresponds to adjusting the value. For example, the media guidance application may iteratively compare (e.g., by executing a for-loop) the type of the media asset with the types of media assets stored in a database (e.g., stored in storage 508 (FIG. 5) or at media guidance data source 618 accessible via communications network 614 (FIG. 6)). The media guidance application may determine (e.g., via control circuitry 504 (FIG. 5)) that the type corresponds to a first type of the plurality of types stored in the database. For example, based on each character of a string of characters for the type of the first media asset (e.g., "drama") matching each character of a string of characters for a type in a particular entry, the media guidance application may determine that the two correspond.

If, at 916, the media guidance application determines that the type corresponds to adjusting the value, process 900 continues to 918, where the media guidance application adjusts (e.g., via control circuitry 504 (FIG. 5)) the value by an amount based on the type. For example, the media guidance application may retrieve (e.g., via control circuitry 504 (FIG. 5)), from a field associated with the matched first type in the database (e.g., stored in storage 508 (FIG. 5) or at media guidance data source 618 accessible via communications network 614 (FIG. 6)), an instruction corresponding to the type. The instruction may be to increase, decrease, multiple, divide, or perform any other mathematical operation to the current value of the threshold period of time by a particular amount. The media guidance application may then adjust (e.g., via control circuitry 504 (FIG. 5)) the value for the threshold period of time based on the adjustment instruction. Process 900 then continues to 920, described further below.

If, at 916, the media guidance application determines that the type does not correspond to adjusting the value, process 900 continues to 920, where the media guidance application compares (e.g., via control circuitry 504 (FIG. 5)) the value for the threshold period of time with the period of time to determine whether the value or the period of time is greater. For example, the media guidance application may compare (e.g., via control circuitry 504 (FIG. 5)) the difference in playback between the two sources (e.g., two of content source 616 (FIG. 6)) of the media asset to the adjusted threshold period of time. The media guidance application may determine (e.g., via control circuitry 504 (FIG. 5)) whether values for the threshold and the period of time are in the same units and convert the units appropriately.

Figure 10:
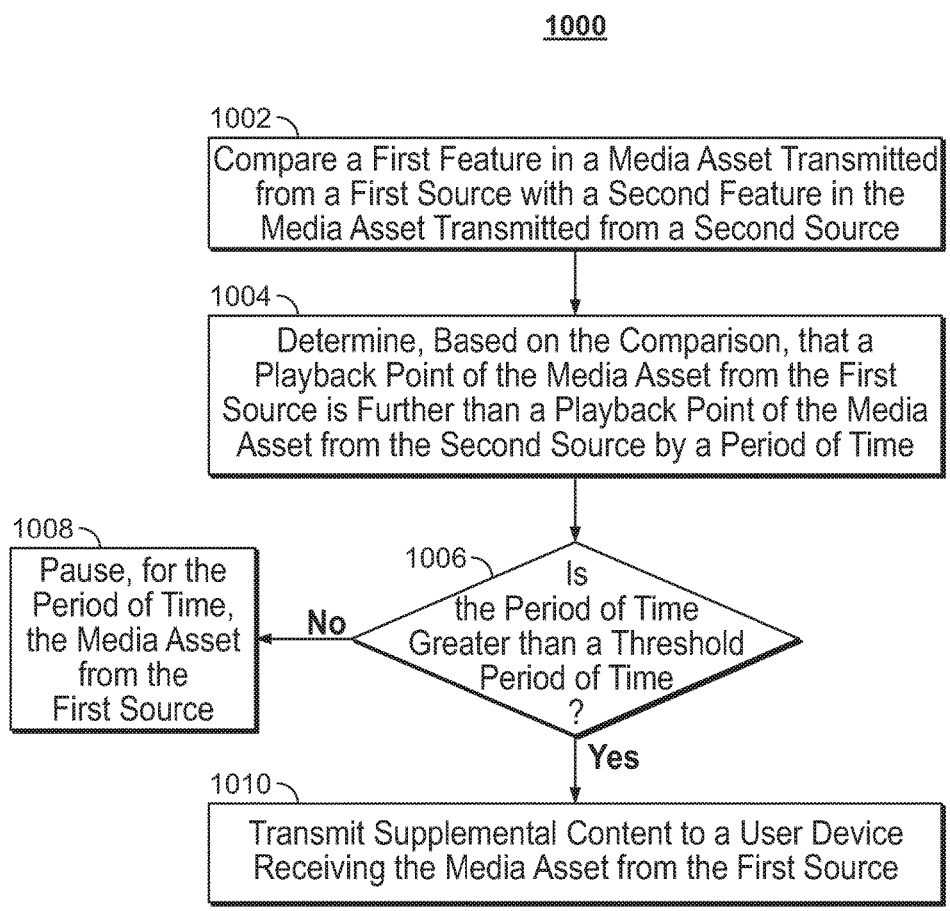
FIG. 10 is another flowchart of illustrative steps for synchronizing playback of media assets from multiple sources, in accordance with some embodiments of the disclosure.

FIG. 10 is another flowchart of illustrative steps for synchronizing playback of media assets from multiple sources, in accordance with some embodiments of the disclosure. For example, a media guidance application implementing process 1000 may be executed by control circuitry 504 (FIG. 5). It should be noted that process 1000 or any step thereof could be performed on, or provided by, any of the devices shown in FIGS. 5-6.

Process 1000 begins with 1002, where the media guidance application compares (e.g., via control circuitry 504 (FIG. 5)) a first feature in a media asset transmitted from a first source with a second feature in the media asset transmitted from a second source. For example, the media guidance application may determine (e.g., via control circuitry 504 (FIG. 5)) whether the media asset can be received from the first source (e.g., content source 616 (FIG. 6)) and/or the second source (e.g., based on permissions). If the media guidance application can receive the media asset from a source, the media guidance application receives (e.g., via control circuitry 504 (FIG. 5)) frames of the media asset. The media guidance application may analyze (e.g., via control circuitry 504 (FIG. 5)) the audiovisual content of frames of the media asset received from the first and second sources. Specifically, the media guidance application may detect (e.g., via control circuitry 504 (FIG. 5)) a particular feature, such as a character, a sound, a distinctive object such as a car, or any other audio or visual feature in the media asset. Based on detecting a particular feature in the media asset received from one of the sources, the media guidance application may search (e.g., via control circuitry 504 (FIG.

5)) for that same feature in frames received from the other source. For example, the media guidance application may find (e.g., via control circuitry 504 (FIG. 5)) a particular set of instructions for generating a face in pixel coordinates, or audio of particular frequencies and intensities in a data packet for the media asset from one source and may search for the same data in data packets received from the other source. Alternatively or additionally, the media guidance application may determine (e.g., via control circuitry 504 (FIG. 5)) that while the two features are not identical they correspond (e.g., within a margin of error) or that the features, while different, indicate a particular difference in time that can be used to resynchronize the sources (e.g., the time remaining in a sporting event).

Process 1000 continues to 1004, where the media guidance application determines (e.g., via control circuitry 504 (FIG. 5)), based on the comparison, that a playback point of the media asset from the first source is further than a playback point of the media asset from the second source by a period of time. For example, the media guidance application may determine (e.g., via control circuitry 504 (FIG. 5)) a frame index (e.g., a time code) for the frames where the first feature and the second feature appear. Based on the frame rate (e.g., 24 frames per second) or alternatively a time code (e.g., which indicates hours:minutes:seconds:frame) the media guidance application may determine (e.g., via control circuitry 504 (FIG. 5)) whether the first feature appears before the second feature or vice versa. The media guidance application may then determine (e.g., via control circuitry 504 (FIG. 5)) whether the first source or the second source (e.g., one of two content sources 616 (FIG. 6)) is at a further playback point (e.g., in the media asset itself, irrespective of any content added in such as advertisements). Based on the difference between the time codes or frame indexes, the media guidance application may determine (e.g., via control circuitry 504 (FIG. 5)) the period of time that the two sources are out of synchronization.

Process 1000 continues to 1006, where the media guidance application determines (e.g., via control circuitry 504 (FIG. 5)) if the period of time is greater than a threshold period of time. For example, the media guidance application may compare (e.g., via control circuitry 504 (FIG. 5)) the difference in playback between the two sources (e.g., two of content source 616 (FIG. 6)) of the media asset to a threshold (e.g., 2 seconds). The media guidance application may determine (e.g., via control circuitry 504 (FIG. 5)) whether values for the threshold and the period of time are in the same units and convert the units appropriately. The threshold may be any unit of time and may be variable depending on different user's preferences, as described further with respect to FIG. 9.

If, at 1006, the media guidance application determines that the period of time is not greater than the threshold period of time, process 1000 continues to 1008, where the media guidance application pauses (e.g., via control circuitry 504 (FIG. 5)), for the period of time, the media asset from the first source. For example, the media guidance application may determine (e.g., via control circuitry 504 (FIG. 5)) that since the media asset is out of svynchronization between the two sources (e.g., two of content source 616 (FIG. 6)) by less than the threshold period of time, supplemental content need not be displayed and the media asset can be paused from the source that is further ahead. Specifically, the media guidance application may transmit (e.g., via control circuitry 504 (FIG. 5)) an instruction to a user device (e.g., any of user equipment discussed with respect to FIGS. 5-6) to pause the media asset (e.g., if the user device has recording capabilities), or the media guidance application may store a buffer (e.g., in storage 508 (FIG. 5)). The media guidance application may transmit (e.g., via control circuitry 504 (FIG. 5)) the same frame to the user device to simulate the user device pausing the media asset.

If, at 1006, the media guidance application determines that the period of time is not greater than the threshold period of time, process 1000 continues to 1010, where the media guidance application transmits (e.g., via control circuitry 504 (FIG. 5)) supplemental content to a user device receiving the media asset from the first source. For example, the media guidance application may transmit (e.g., via control circuitry 504 (FIG. 5)) frames of supplemental content to the user device (e.g., any of user equipment discussed with respect to FIGS. 5-6) receiving the media asset from the first source (e.g., which is ahead of the action of the media asset from the second source) instead of the media asset, in order to resynchronize the media asset from both sources (e.g., two of content source 616 (FIG. 6)). The supplemental content may be retrieved from a database (e.g., stored in storage 508 (FIG. 5) or at media guidance data source 618 accessible via communications network 614 (FIG. 6)) and may be retrieved such that the length of the supplemental content corresponds to the period of time that the two sources are out of synchronization. Upon completing transmission of the supplemental content, the media guidance application may transmit (e.g., via control circuitry 504 (FIG. 5)) the media asset from the point at which supplemental content was first transmitted, such that the two sources are synchronized (e.g., the action in the media asset from the second source caught up while the supplemental content was transmitted).

It is contemplated that the steps or descriptions of each of FIGS. 7-10 may be used with any other embodiment of this disclosure. In addition, the steps and descriptions described in relation to FIGS. 7-10 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIGS. 7-10.

While some portions of this disclosure may make reference to "convention," any such reference is merely for the purpose of providing context to the invention(s) of the instant disclosure, and does not form any admission as to what constitutes the state of the art.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for synchronizing playback of media assets from multiple sources, the method comprising:
    comparing, at a synchronization server, a first feature in a media asset transmitted from a first source with a second feature in the media asset transmitted from a second source;
    determining, by the synchronization server, based on the comparison, that a playback point of the media asset from the first source is further than a playback point of the media asset from the second source by a period of time;
    determining, by the synchronization server, whether the period of time is greater than a threshold period of time;
    in response to determining, by the synchronization server, that the period of time is greater than the threshold period of time:
        comparing the period of time to a plurality of durations stored in a supplemental content database, wherein each of a plurality of supplemental content stored in the supplemental content database is associated with a field containing one of the plurality of durations;
        determining that the period of time matches a duration of the plurality of durations;
        in response to determining that the period of time matches a duration of the plurality of durations:
            retrieving a first supplemental content associated with the duration matching the period of time;
            transmitting the first supplemental content from the synchronization server to a user device receiving the media asset from the first source instead of the media asset;
            storing, in a buffer of the synchronization server, a portion of the media asset received from the first source while transmitting the first supplemental content instead of transmitting the portion of the media asset; and
            upon completion of transmission of the first supplemental content, transmitting the portion of the media asset from the buffer to the user device; and
    in response to determining that the period of time is not greater than the threshold period of time, pausing, for the period of time, the media asset from the first source.

2. The method of claim 1, further comprising:
    simultaneously receiving a first portion of the media asset from the first source and a second portion of the media asset from the second source by:
        receiving a first plurality of frames over a first time interval from the first source;
        receiving a second plurality of frames over the first time interval from the second source; and
        storing the first plurality of frames and the second plurality of frames.

3. The method of claim 2, wherein comparing the first feature in the media asset transmitted from the first source with the second feature in the media asset transmitted from the second source comprises:
    determining the first feature in a first frame of the first portion;
    searching frames of the second portion to determine a second frame containing the first feature;
    determining a second feature in the second frame of the second portion;
    comparing audiovisual properties of the first feature with the audiovisual properties of the second feature; and
    determining, based on comparing the audiovisual properties of the first feature with the audiovisual properties of the second feature, that the second feature corresponds to the first feature.

4. The method of claim 3, wherein determining the first feature in the first frame of the first portion comprises:
    analyzing the audiovisual properties of the first frame;
    determining an object in the first frame based on analyzing the audiovisual properties;
    comparing the object with a plurality of objects stored in a database for the media asset;
    determining that the object matches a first object of the plurality of objects; and
    in response to determining that the object matches the first object, determining that the object is the first feature.

5. The method of claim 1, wherein determining, based on the comparison, that the playback point of the media asset from the first source is further than the playback point of the media asset from the second source by the period of time comprises:
    retrieving, from a first time code signal associated with the media asset from the first source, a first time code corresponding to the playback point containing the first feature;
    retrieving, from a second time code signal associated with the media asset from the second source, a second time code corresponding to the playback point containing the second feature; and
    computing the period of time by subtracting the second time code from the first time code.

6. The method of claim 1, wherein determining whether the period of time is greater than the threshold period of time comprises:
    retrieving a user profile for a user associated with the user device receiving the media asset from the first source;
    retrieving, from the user profile, a user preference;
    comparing the user preference to a plurality of user preferences stored in a database, wherein each user preference of the plurality of user preferences corresponds to one of a plurality of threshold periods of time;
    determining that the user preference corresponds to a stored user preference in the database; and
    retrieving a first threshold period of time corresponding to the stored user preference as the threshold period of time.

7. The method of claim 1, further comprising:
    receiving a user selection from a first user to synchronize viewing of the media asset with a second user;
    determining that the first user is consuming the media asset from the first source and that the second user is consuming the media asset from the second source;
    determining that the first source and the second source are different; and
    in response to determining that the first source and the second source are different, simultaneously receiving a first portion of the media asset from the first source and a second portion of the media asset from the second source.

8. The method of claim 1, further comprising:
    determining that the period of time does not match any duration of the plurality of durations;
    determining that the period of time is within a threshold duration of a first duration of the plurality of durations;

in response to determining that the period of time is within the threshold duration of the first duration, determining whether the first duration is greater than the period of time;

in response to determining that the first duration is greater than the period of time, removing a first frame of a second supplemental content associated with the first duration; and in response to determining that the first duration is not greater than the period of time, inserting a second frame into the second supplemental content associated with the first duration.

9. The method of claim 1, further comprising:
determining that the period of time does not match any duration of the plurality of durations;
determining that the period of time is greater than a threshold duration of each of the plurality of durations;
in response to determining that the period of time is greater than the threshold duration of each of the plurality of durations, determining a subset of the plurality of durations, wherein a total duration of the subset matches the period of time; and
generating a custom supplemental content by combining each supplemental content associated with the subset of the plurality of durations.

10. The method of claim 1, wherein pausing, for the period of time, the media asset from the first source comprises:
determining whether the user device receiving the media asset from the first source has buffering capabilities;
in response to determining that the user device receiving the media asset from the first source does not have buffering capabilities:
storing the media asset received from the first source in the buffer; and
transmitting an identical frame from the media asset to the user device during the period of time; and
in response to determining that the user device receiving the media asset from the first source does have buffering capabilities, transmitting an instruction to the user device to pause the media asset for the period of time.

11. A system for synchronizing playback of media assets from multiple sources, the system comprising:
storage circuitry configured to store a supplemental content database, wherein each of a plurality of supplemental content stored in the supplemental content database is associated with a field containing one of a plurality of durations;
a buffer configured to temporarily store a portion of a media asset; and
control circuitry configured to:
compare a first feature in the media asset transmitted from a first source with a second feature in the media asset transmitted from a second source;
determine, based on the comparison, that a playback point of the media asset from the first source is further than a playback point of the media asset from the second source by a period of time;
determine whether the period of time is greater than a threshold period of time;
in response to determining that the period of time is greater than the threshold period of time:
compare the period of time to the plurality of durations stored in the supplemental content database;
determine that the period of time matches a duration of the plurality of durations;

in response to determining that the period of time matches a duration of the plurality of durations:
retrieve a first supplemental content associated with the duration matching the period of time;
transmit the first supplemental content to a user device receiving the media asset from the first source instead of the media asset;
store, in the buffer, the portion of the media asset received while transmitting the first supplemental content instead of transmitting the portion of the media asset; and
upon completion of transmission of the first supplemental content, transmit the media asset from the buffer to the user device; and
in response to determining that the period of time is not greater than the threshold period of time, pause, for the period of time, the media asset from the first source.

12. The system of claim 11, wherein the control circuitry is further configured to:
simultaneously receive a first portion of the media asset from a first source and the second portion of the media asset from the second source by:
receiving a first plurality of frames over a first time interval from the first source;
receiving a second plurality of frames over the first time interval from the second source; and
storing the first plurality of frames and the second plurality of frames.

13. The system of claim 12, wherein the control circuitry is further configured, when comparing the first feature in the media asset transmitted from the first source with the second feature in the media asset transmitted from the second source, to:
determine the first feature in a first frame of the first portion;
search frames of the second portion to determine a second frame containing the first feature;
determine a second feature in the second frame of the second portion;
compare audiovisual properties of the first feature with the audiovisual properties of the second feature; and
determine, based on comparing the audiovisual properties of the first feature with the audiovisual properties of the second feature, that the second feature corresponds to the first feature.

14. The system of claim 13, wherein the control circuitry is further configured, when determining the first feature in the first frame of the first portion, to:
analyze the audiovisual properties of the first frame;
determine an object in the first frame based on analyzing the audiovisual properties;
compare the object with a plurality of objects stored in a database for the media asset;
determine that the object matches a first object of the plurality of objects; and
in response to determining that the object matches the first object, determine that the object is the first feature.

15. The system of claim 11, wherein the control circuitry is further configured, when determining, based on the comparison, that the playback point of the media asset from the first source is further than the playback point of the media asset from the second source by the period of time, to:
retrieve, from a first time code signal associated with the media asset from the first source, a first time code corresponding to the playback point containing the first feature;

retrieve, from a second time code signal associated with the media asset from the second source, a second time code corresponding to the playback point containing the second feature; and compute the period of time by subtracting the second time code from the first time code.

16. The system of claim 11, wherein the control circuitry is further configured, when determining whether the period of time is greater than the threshold period of time, to:

retrieve a user profile for a user associated with the user device receiving the media asset from the first source;

retrieve, from the user profile, a user preference;

compare the user preference to a plurality of user preferences stored in a database, wherein each user preference of the plurality of user preferences corresponds to one of a plurality of threshold periods of time;

determine that the user preference corresponds to a stored user preference in the database; and retrieve a first threshold period of time corresponding to the stored user preference as the threshold period of time.

17. The system of claim 11, wherein the control circuitry is further configured to:

receive a user selection from a first user to synchronize viewing of the media asset with a second user;

determine that the first user is consuming the media asset from the first source and that the second user is consuming the media asset from the second source;

determine that the first source and the second source are different; and in response to determining that the first source and the second source are different, simultaneously receive a first portion of the media asset from the first source and a second portion of the media asset from the second source.

18. The system of claim 11, wherein the control circuitry is further configured to:

determine that the period of time does not match any duration of the plurality of durations;

determine that the period of time is within a threshold duration of a first duration of the plurality of durations;

in response to determining that the period of time is within the threshold duration of the first duration, determine whether the first duration is greater than the period of time;

in response to determining that the first duration is greater than the period of time, remove a first frame of a second supplemental content associated with the first duration; and in response to determining that the first duration is not greater than the period of time, insert a second frame into the second supplemental content associated with the first duration.

19. The system of claim 11, wherein the control circuitry is further configured to:

determine that the period of time does not match any duration of the plurality of durations;

determine that the period of time is greater than a threshold duration of each of the plurality of durations;

in response to determining that the period of time is greater than the threshold duration of each of the plurality of durations, determine a subset of the plurality of durations, wherein a total duration of the subset matches the period of time; and generate a custom supplemental content by combining each supplemental content associated with the subset of the plurality of durations.

20. The system of claim 11, wherein the control circuitry is further configured, when pausing, for the period of time, the media asset from the first source, to:

determine whether the user device receiving the media asset from the first source has buffering capabilities;

in response to determining that the user device receiving the media asset from the first source does not have buffering capabilities:

store the media asset received from the first source in the buffer; and transmit an identical frame from the media asset to the user device during the period of time; and in response to determining that the user device receiving the media asset from the first source does have buffering capabilities, transmit an instruction to the user device to pause the media asset for the period of time.

\* \* \* \* \*